(12) United States Patent
Gnedenko et al.

(10) Patent No.: US 7,299,756 B2
(45) Date of Patent: Nov. 27, 2007

(54) APPARATUS FOR PROCESSING WASTE WITH DISTRIBUTION/MIXING CHAMBER FOR OXIDISING FLUID

(75) Inventors: Valeri G. Gnedenko, Moscow (RU); Alexandre L. Souris, Moscow (RU); David Pegaz, Netanya (IL)

(73) Assignee: E.E.R. Environmental Energy Resources (Israel) Ltd., Ramat Gan (IL)

( * ) Notice: Subject to any disclaimer, the term of this patent is extended or adjusted under 35 U.S.C. 154(b) by 225 days.

(21) Appl. No.: 10/469,926

(22) PCT Filed: Feb. 18, 2002

(86) PCT No.: PCT/IL02/00125

§ 371 (c)(1),
(2), (4) Date: Apr. 22, 2004

(87) PCT Pub. No.: WO02/070412

PCT Pub. Date: Sep. 12, 2002

(65) Prior Publication Data

US 2006/0086294 A1  Apr. 27, 2006

(30) Foreign Application Priority Data

Mar. 5, 2001  (IL)  ..................................... 141814

(51) Int. Cl.
*F23G 5/10* (2006.01)
(52) U.S. Cl. ................... 110/250; 110/315; 110/346
(58) Field of Classification Search ............... 110/315, 110/316, 342, 346, 238, 242, 250
See application file for complete search history.

(56) References Cited

U.S. PATENT DOCUMENTS 3,841,239 A * 10/1974 Nakamura et al. .......... 110/342

(Continued)

FOREIGN PATENT DOCUMENTS

EP  0 825 869 A2  11/1994

(Continued)

OTHER PUBLICATIONS

Kubota Corp, "Vertical Melting Furnace", *Patent Abstracts of Japan* of JP 10110917 A2 (Apr. 28, 1998).

(Continued)

*Primary Examiner*—Kenneth Rinehart
(74) *Attorney, Agent, or Firm*—Browdy and Neimark, PLLC

(57) ABSTRACT

A waste processing apparatus for processing a column of waste in a processing chamber having one or more gas outlets at an upper part thereof and one or more plasma torches having an output end thereof extending into a lower part of the chamber. The apparatus is characterised in having one or more oxidising fluid distribution and mixing chambers and one or more oxidising fluid inlet associated therewith for providing oxidising fluid to said distribution and mixing chamber from a suitable source, wherein each oxidizing and mixing chamber has a peripheral opening in substantially continuous peripheral fluid communication with a column of waste accommodated in the lower part of the chamber and in fluid communication with the oxidising fluid inlets, and further, the outer peripheral wall of the distribution and mixing chamber is formed by a lateral outward displacement of an inwardly-facing wall of the lower part of the processing chamber with respect to an inwardly-facing wall of the upper part of the processing chamber. The oxidising fluid inlets are separate from and associated with the plasma torches such that during operation of apparatus oxidising fluid flowing from the oxidising fluid inlets into said distribution and mixing chamber is directed at a high temperature zone provided by the plasma torches that are associated with the oxidising fluid inlets.

34 Claims, 11 Drawing Sheets

U.S. PATENT DOCUMENTS

| | | |
|---|---|---|
| 4,831,944 A | 5/1989 | Durand et al. |
| 5,143,000 A | 9/1992 | Camacho |
| 5,657,706 A | 8/1997 | Liagre et al. |

FOREIGN PATENT DOCUMENTS

| | | |
|---|---|---|
| EP | 0 850 885 A1 | 1/1998 |
| EP | 0 837 041 A1 | 4/1998 |

OTHER PUBLICATIONS

Kubota Corp, "Vertical Melting Furnace", *Patent Abstracts of Japan* of JP 10089645 A2 (Apr. 10, 1998).

Moskovskoe Nauchno-Proizvodstvennoe Ob'edinenie "RADON", *English Abstracts* of SU 1715107 (Jul. 6, 1993).

* cited by examiner

APPARATUS FOR PROCESSING WASTE WITH DISTRIBUTION/MIXING CHAMBER FOR OXIDISING FLUID

TECHNICAL FIELD

The present invention relates to an apparatus for the conversion of waste, including the processing, treatment or disposal of waste. In particular, the present invention is directed to an improved arrangement for mixing, distributing and preheating oxidising fluids including gases or other reagents provided to a furnace in a plasma torch based waste processing plant.

BACKGROUND

The processing of waste including municipal waste, medical waste, toxic and radioactive waste by means of plasma-torch based waste processing plants is well known. Referring to FIG. 1, a typical prior art plasma-based processing plant (1) comprises a processing chamber (10) typically in the form of a vertical shaft, in which typically solid, and also mixed (i.e., generally, solid plus liquid and/or semiliquid), waste (20) is introduced at the upper end thereof via a waste inlet means comprising an air lock arrangement (30). One or a plurality of plasma torches (40) at the lower end of the chamber (10) heats the column (35) of waste in the chamber (10), converting the waste into gases that are channeled off via outlet (50), and a liquid material (38) (typically molten metals and/or slag) which is periodically or continuously collected at the lower end of the chamber (10) via reservoir (60). Oxidising gases or fluids, such as air, oxygen or steam (70) may be provided at the lower end of the chamber (10) to convert char residues comprising carbon, produced in the processing of organic waste, into useful product gases such as CO and $H_2$, for example. A similar arrangement for dealing with solid waste is described in U.S. Pat. No. 5,143,000, the contents of which are incorporated herein by reference thereto.

At least two problems are commonly encountered relating to the provision of oxidising fluids to the chamber that prevent smooth operation of such processing plants or furnaces. As waste is processed and proceeds to the lower, hotter parts of the chamber, inorganic waste in the form of molten or semi-molten material (including metal, oxides, salts and so on) may be deposited on the chamber walls, at times obstructing or at least partially obstructing the oxidising gas or fluid outlets into the chamber, as well as the plasma torch outlets. Once this happens, the deposited material can only be removed manually, i.e., by shutting down the plant, and after it cools down mechanically or otherwise removing the obstruction, or, by increasing the temperature in the chamber so that the deposited material (metal, oxides, salts and so on) melts and flows away from the oxidising gas outlet. The first solution results in plant down-time, with the ensuing economic penalties. The second solution is not always feasible, and requires more power to be provided to the chamber, which reduces the thermal and economic efficiency of the plant.

The second problem is in providing oxidising fluid or gases to the waste thoroughly and rapidly, so that all of the char in the waste may be converted into useful gases effectively and efficiently. In many prior art processing plants, oxidising gases are directed towards the axis of the chamber, and while penetrating the waste column to some extent, homogenous distribution is not achieved. In U.S. Pat. No. 5,143,000, steam is introduced tangentially into a lower part of the processing chamber, about half-way between the longitudinal axis of the chamber and the wall thereof. This configuration is also not very effective in distributing the oxidising fluid, since the amorphous and dense composition of the waste at this part of the chamber prevents the oxidising fluid from reaching all parts of the waste effectively. SU 1715107 describes a waste processing plant having a lower double-walled water cooled metal crucible, in which an inductor is used for providing heat to the waste, and an upper part made from refractory material, and having the same internal diameter as the lower crucible. Oxidising gas is provided at a location between the upper part and the crucible via a plurality of circumferentially placed openings therein, serviced by an external annular air pipe arrangement made from metal. This arrangement is specifically described with respect to a plant based on induction heating, and would not be suitable for a plasma-based plant, where the operating temperatures are much higher and refractory materials are usually necessary for the crucible part thereof, since the metal pipe would melt. In fact, the annular pipe configuration, while providing a multitude of oxidising fluid entry ports into the chamber, is not readily adaptable to processing plants in which the lower part of the processing chamber is made from a refractory material rather than metal, as such refractory material does not easily lend itself to having a plurality of bores drilled therein, since, for example, the mechanical strength of the furnace wall is substantially weakened. Further, providing a plurality of individual and separate locations along the circumference for injecting the oxidising gases is not fully effective in enabling the gases to penetrate into the waste column, in particular discrete inlets tend to get blocked during operation of the chamber, as mentioned hereinbefore, and the water cooling provided to the crucible results in some solidification and material deposition thereon, which exacerbates the blocking of the inlets.

Thus, none of the above patents, the contents of which are incorporated herein by reference thereto, provide adequate distribution of oxidising gases to the waste column, particularly in a plant in which the lower hotter part of the processing chamber is made from refractory material. Further, none of these patents disclose or suggest how to avoid obstruction of the oxidising gas inlet ports or plasma torches due to deposition of melted or semi-molten inorganic waste thereon.

It is therefore an aim of the present invention to provide an oxidising gas inlet system for enabling efficient and rapid introduction of oxidising gasses to the waste which overcomes the limitations of prior art plants.

It is another aim of the present invention to provide such a system that will allow the mixing of the relatively cold oxidising gases or fluid with the hot plasma gases generated by the plasma torches such as to enable the uniform and rapid reaction of preheated oxidising gases or fluid and char in the gasification zone.

It is another aim of the present invention to provide such a system that may be incorporated into a solid waste processing apparatus.

It is another aim of the present invention to provide a system for substantially avoiding the blocking of oxidising gas inlet ports and/or plasma torches in a plasma-torch type processing apparatus.

It is another aim of the present invention to provide such a device that is relatively simple mechanically and thus economic to incorporate into a processing chamber design.

It is another aim of the present invention to provide such a system incorporated as an integral part of a plasma-torch based type mixed waste converter.

It is also an aim of the present invention to provide such a system that is readily retrofittable with respect to at least some existing plasma-based waste converters.

The present invention achieves these and other aims by providing an oxidising fluid distribution channel or chamber incorporated into the design of the processing chamber, the channel having at least one oxidising fluid entry port or inlet associated therewith for introducing oxidising fluid therein from a suitable supply. The channel is recessed with respect to the waste column so that the oxidising fluids are initially separated from the waste column, enabling the oxidising fluids to be distributed circumferentially or at least peripherally around the waste column, thereby enabling the oxidising fluids to then penetrate into the waste column from all directions. Such a channel may be formed as an integral part of the chamber using refractory material. The plasma torches may be similarly located in a recess-type feature also incorporated in the refractory material, to minimise obstruction by deposited inorganic material.

While some plasma-based processing plants may have a recess or channel between part of the waste column and part of the wall of processing chamber, such recesses are not functional in the sense of the present invention. In other words, they are not directed to provide circumferential distribution of oxidising fluid to a part of the waste column in which char is being converted to product gases, and indeed are not adapted for so doing. Indeed, as exemplified by U.S. Pat. No. 4,831,944, some such prior art plants neither disclose nor suggest any facilities at all for providing oxidising fluid to the waste, much less for the circumferential distribution thereof, and are neither directed to solving the problems addressed by the present invention nor provide a similar solution. Japanese Patent Nos. JP 10110917 and JP 10089645 each describe a vertical melting furnace having a bulging mid-section in which are provided a plurality of combustion gas supply ports to form an annular combustion chamber. No plasma torches are used in these furnaces. Combustion gases are thereby provided to the annular combustion space provided in the mid-section in order to burn waste in the thermal decomposition zone and thus prevent or reduce bridging thereat. Air is provided to the furnace by means of a plurality of inlet ports at the lower end of the furnace, where the furnace cross-section returns to the original unbulged size. Such a system is not readily suitable for a plasma torch based processing plant. For example, some cooling of the melted inorganic materials at the lower end of the processing chamber would result due to the cooling effect of the air provided thereat, which could in turn cause blockage of the fluid inlet ports by solidifying inorganic material. Furthermore, while combustion gases are provided in the bulging section for burning product gases, there is no suggestion of supplying oxidising fluid thereat exclusively for the purpose of converting organic waste such as char into product gases. On the contrary, the aim of these patents is to reduce bridging and requires the addition of combustion gases within the bulging section to do so, oxidising air being provided to the furnace rather than the bulging section via the lower inlet ports, as described above. Such a system is thus not readily suitable for preheating oxidising gases and char inside the combustion chamber without the combustion of fuel therein.

U.S. Pat. No. 5,657,706 relates to an apparatus for processing waste, which is separated into three vertical sections. Waste is input via the middle section, the gasification chamber, and combustion air is delivered thereto via lateral openings level with the soleplates (not shown in the Figure). However, there appears to be no disclosure or suggestion of a distribution and mixing chamber for distributing and mixing oxidizing fluid around a column of waste. In particular, no mixing and distribution chamber is described nor hinted at having a peripheral opening in continuous peripheral fluid communication with a column of waste, nor having an outer peripheral wall which is formed as in the present invention.

EP 850,885 relates to a melt treatment apparatus which comprises a passage which is laterally displaced from the main chamber, and which comprises an inlet for a gas such as air. The passage is provided for melt discharging and is not for distributing oxidising fluid around any waste—the location of the gas inlet is substantially downstream of the lower end of the waste. No distribution and mixing chamber for oxidizing fluids is disclosed or hinted at, less so one having a peripheral opening in continuous peripheral fluid communication with a column of waste, nor having an outer peripheral wall which is formed as in the present invention.

EP 837,041 relates to a plasma treatment of ashes, in which a number of tiltable electrodes are provided in a plasma-based apparatus. While the wall of the lower part of the apparatus is laterally displaced with respect to an upper part thereof, the lances which are used to provide air and steam are located in the upper part of the apparatus, and are thus not directly associated with the displaced wall of the lower part. Furthermore, there is a lack of fluid communication between the upper part of the chamber comprising these lances, and the lower wider part of the chamber, due to a blocking plug of waste in the upper part that is present during operation of the chamber. There is no disclosure or hint of a mixing and distribution chamber for distributing oxidizing fluids from the lances around a lower part of the column of waste, less so as in the present invention.

EP 625,869 relates to a plasma arc apparatus that may be used for treatment of waste. A melter shell is provided having a smaller diameter than the outer melter hood, providing an annular gap to allow ingression of air into the plasma arc furnace. Thus, as illustrated in the figures, an inner facing wall of the upper part (including the hood) is actually outwardly displaced with respect to the lower part of the apparatus (the melter shell), which is the reverse of the arrangement of the present invention, as will become evident hereinbelow. Furthermore, the only oxidising inlet to the chamber is the upper central port, which lies in the middle of the upper part of the column of waste. Thus, in such a configuration, there is no fluid communication between the upper part of the chamber comprising this inlet, and the lower part of the chamber, due to a blocking plug of waste that is present therein during operation of the chamber. There is no disclosure or hint of a mixing and distribution chamber for distributing oxidizing fluids from the lances around a lower part of the column of waste, less so as in the present invention.

These references fail to disclose or suggest a distribution and mixing chamber having:

a peripheral opening in substantially continuous peripheral fluid communication with a lower part of a said column of waste when said column of waste is accommodated in said lower part and in fluid communication with at least one said oxidising fluid inlet;

an outer peripheral wall thereof formed by a lateral outward displacement of an inwardly-facing wall of said lower part of said processing chamber with respect to an inwardly-facing wall of said upper part of the processing chamber; and wherein at least one said oxidising fluid inlet is separate from and associated with said at least one plasma torch means such that during operation of said apparatus oxidising fluid flowing from the said at least one oxidising fluid inlet into said distribution and mixing chamber is directed at a high temperature zone provided by the at least one plasma torch means that is associated with said at least one oxidising fluid inlet.

Thus, not only are these references are not directed towards providing a mixing and distribution chamber as in the present invention, but they describe features of processing chambers which are different in structure and function to the mixing and distribution chamber of the present invention.

In general, plasma-based processing plants which only provide oxidizing agents via the plasma torches are also limited in that if more oxidising fluid is needed for processing the char, this results in a corresponding lowering of the temperature produced by the plasma torches. This in turn results in greater inorganic material deposits, which in turn cause the congestion problems discussed above. On the other hand, if it is desired to increase the temperature of the plasma torches, the oxidising fluid provided thereto must be reduced, which results in char in the waste column not being fully oxidised into product gases or alternatively the power that needs to be provided to the plasma torches has to be raised, which reduces the efficiency of the process. Thus, providing an oxidising fluid inlet, independent from the plasma torches, allows additional freedom in the way in which the processing plant may be used, as this enables both the temperature of the plasma jets and the volume flow rate of oxidising fluid to be increased simultaneously as required. However, plasma torch based furnaces which employ oxidising fluid inlets independent from the plasma torches are not necessarily without problems. Such furnaces need to be designed such a manner that the oxidising fluid inlets, which provide relatively cool oxidising gases or fluids, are sufficiently spaced from the inorganic melted products, and in particular from the discharging outlets thereof. Otherwise, congestion of these discharging outlets may occur due to the cooling of the melt (and solidification thereof) by the action of the relatively cool oxidising fluids on the melt.

SUMMARY OF INVENTION

The present invention relates to a waste processing apparatus having a waste processing chamber adapted for accommodating a column of waste, at least one gas outlet means at an upper longitudinal part of the chamber, at least one plasma torch means having an output end thereof extending into a lower part of said waste processing chamber for providing sufficient heat to said lower part at least for enabling organic waste accommodated therein to be converted into fuel gases, said processing chamber having a bottom end, the apparatus characterised in comprising at least one oxidising fluid distribution and mixing chamber and at least one oxidising fluid inlet associated therewith for providing oxidising fluid to said distribution and mixing chamber from a suitable source, wherein said oxidizing and mixing chamber comprises:

a peripheral opening in substantially continuous peripheral fluid communication with a lower part of a said column of waste when said column of waste is accommodated in said lower part and in fluid communication with at least one said oxidising fluid inlet; and an outer peripheral wall thereof formed by a lateral outward displacement of an inwardly-facing wall of said lower part of said processing chamber with respect to an inwardly-facing wall of said upper part of the processing chamber;

wherein at least one said oxidising fluid inlet is separate from and associated with said at least one plasma torch means such that during operation of said apparatus oxidising fluid flowing from the said at least one oxidising fluid inlet into said distribution and mixing chamber is directed at a high temperature zone provided by the at least one plasma torch means that is associated with said at least one oxidising fluid inlet.

Thus, typically, at least a part of an inwardly facing wall of said lower part of said processing chamber is laterally displaced outwardly with respect to an inwardly-facing wall of said upper part of the processing chamber such as to provide said at least one distribution and mixing chamber between said outwardly laterally displaced inwardly facing wall and a circumferential periphery of part of the column of waste that may be accommodated in said processing chamber downstream of said upper part, said at least one distribution and mixing chamber being adapted to provide fluid communication between said periphery of a waste column accommodated in said lower part and said at least one oxidising fluid inlet.

The laterally displaced inwardly facing wall and the inner-facing part of said lower part of said processing chamber are typically made from a suitable refractory material.

The laterally displaced inwardly facing wall may be laterally displaced from said inwardly-facing wall of said upper part by a first displacement that is about constant along said inwardly facing wall. Alternatively, the laterally displaced inwardly facing wall is laterally displaced from said inwardly-facing wall of said upper part by a first displacement that is relatively greater at a location where said at least one oxidising fluid inlet is comprised than an average said displacement taken along said inwardly facing wall. Such a first displacement at about 180° from said at least one oxidising fluid inlet may be relatively less than an average said displacement taken along said inwardly facing wall.

An upper part of said distribution and mixing chamber may be bound by an upper substantially annular wall laterally or radially extending towards the center thereof from said laterally displaced inwardly facing wall by a second displacement. Typically, the second displacement is similar in magnitude to that of said first displacement. At least one oxidising fluid inlet may be comprised on said laterally displaced inwardly facing wall and/or on said upper annular wall.

At least the inwardly facing wall of said lower part of said processing chamber may be substantially frustoconical in form having a larger conical half-angle than that of an inwardly facing wall of said upper part of the processing chamber, and the upper part may be substantially cylindrical, having a conical half-angle of about 0°.

Alternatively, at least said inwardly facing wall of said lower part of said processing chamber is substantially cylindrical in form having a larger internal radius than that of said upper part of the processing chamber, the upper part being substantially cylindrical.

Alternatively, the inwardly facing wall of said lower part of said processing chamber may be substantially frustro-pyramidal in form having substantially polygonal cross-sections at planes substantially perpendicular to the longitudinal axis of the said processing chamber. The inwardly facing wall of said upper part of said processing chamber may be substantially frustro-pyramidal in form having substantially polygonal cross-sections at planes substantially perpendicular to the longitudinal axis of the said processing chamber. The polygonal cross-sections of said upper part and of said lower part are optionally substantially rectangular.

Optionally, a lower part of said distribution and mixing chamber is in open communication with a bottom part of said lower part of said processing chamber downwardly extending from said laterally displaced inwardly facing wall.

Further optionally, a lower part of said distribution and mixing chamber is bound by a lower annular wall laterally or radially extending towards the center thereof from said laterally displaced inwardly facing wall by a third displacement. Typically, the third displacement is smaller in magnitude to that of said second displacement. The surface area of the said lower annular wall is preferably less than a surface area of the said upper annular wall by an amount S which may range from about 1% to about 99% of the said surface area of the said upper annular wall.

Optionally, the waste processing apparatus further comprises a second oxidising fluid distribution and mixing chamber vertically displaced downwardly with respect to said distribution and mixing chamber. Preferably, the surface area of the lower annular wall thereof is less than a surface area of the upper annular wall thereof by an amount S' which may range from about 1% to about 99% of the said surface area of the said upper annular wall of the said second oxidising fluid distribution and mixing chamber.

Optionally, at least one plasma torch means is comprised in a suitable niche formed in the said bottom part of said processing chamber, such that the output end of said at least one plasma torch is displaced from a said column of waste accommodated in said processing chamber. Further optionally, at least one plasma torch means is comprised in a suitable auxiliary chamber laterally disposed with respect to the processing chamber and in communication therewith via a suitable portal, such that the output end of said at least one plasma torch means is displaced from a said column of waste accommodated in said processing chamber. Alternatively, the waste processing chamber may further comprise a plurality of said auxiliary chambers, wherein each said additional auxiliary chamber is laterally disposed with respect to the processing chamber and in communication therewith via a suitable portal, such that the output end of said at least one plasma torch means comprised therein is displaced from a said column of waste accommodated in said processing chamber. At least one said auxiliary chamber further comprises at least one said oxidising fluid inlet.

Optionally, a discontinuity in the internal profile of the processing chamber is formed between said upper part and said lower part thereof. In particular, the transverse cross-sectional area of said processing chamber taken along planes perpendicular to the longitudinal axis at least between the longitudinal position of the center of an uppermost said oxidising fluid inlet to the longitudinal position of the center of the output end of a lowermost said plasma torch means is substantially greater than the transverse cross-sectional area of said upper part just above said discontinuity. Optionally, at least one said oxidising fluid inlet may be provided at a location in said distribution and mixing chamber such that the angle $\phi$ between the longitudinal axis of the processing chamber and an imaginary line connecting the center of said oxidising fluid inlet to the said discontinuity, taken along a plane including said axis and said center, is in the range of between about 0.5° and about 120°. Further optionally, at least one said oxidising fluid inlet is disposed at a location such that the angle $\beta$ between the plane including the longitudinal axis of the processing chamber and the center of said oxidising fluid inlet, and the plane including the said longitudinal axis and the center of the end of a said plasma torch, is less than or equal to about ±170°, and preferably about ±20°.

Optionally, the said discontinuity is in the form of a cylindrical wall downwardly depending from said upper part and laterally displaced inwardly with respect to said laterally displaced inwardly facing wall.

The present invention is also directed to a method for distributing and mixing oxidizing fluid along and into a periphery of a waste column accommodated in a waste processing apparatus having a waste processing chamber adapted for processing such a waste column and comprising at least one plasma torch means having an output end thereof extending into a lower part of said waste processing chamber for providing sufficient heat to said lower part at least for enabling organic waste accommodated therein to be converted into fuel gases, said method comprising (a) providing a distribution and mixing chamber as described; and (b) during operation of said processing chamber causing oxidising fluid to flow from the said at least one oxidising fluid inlet and into said distribution and mixing chamber and around the periphery of the column of waste accommodated in said processing chamber, such that said oxidizing fluid is directed at a high temperature zone provided by the at least one plasma torch means that is associated with said at least one oxidising fluid inlet.

DISCLOSURE OF INVENTION

Figure 1:
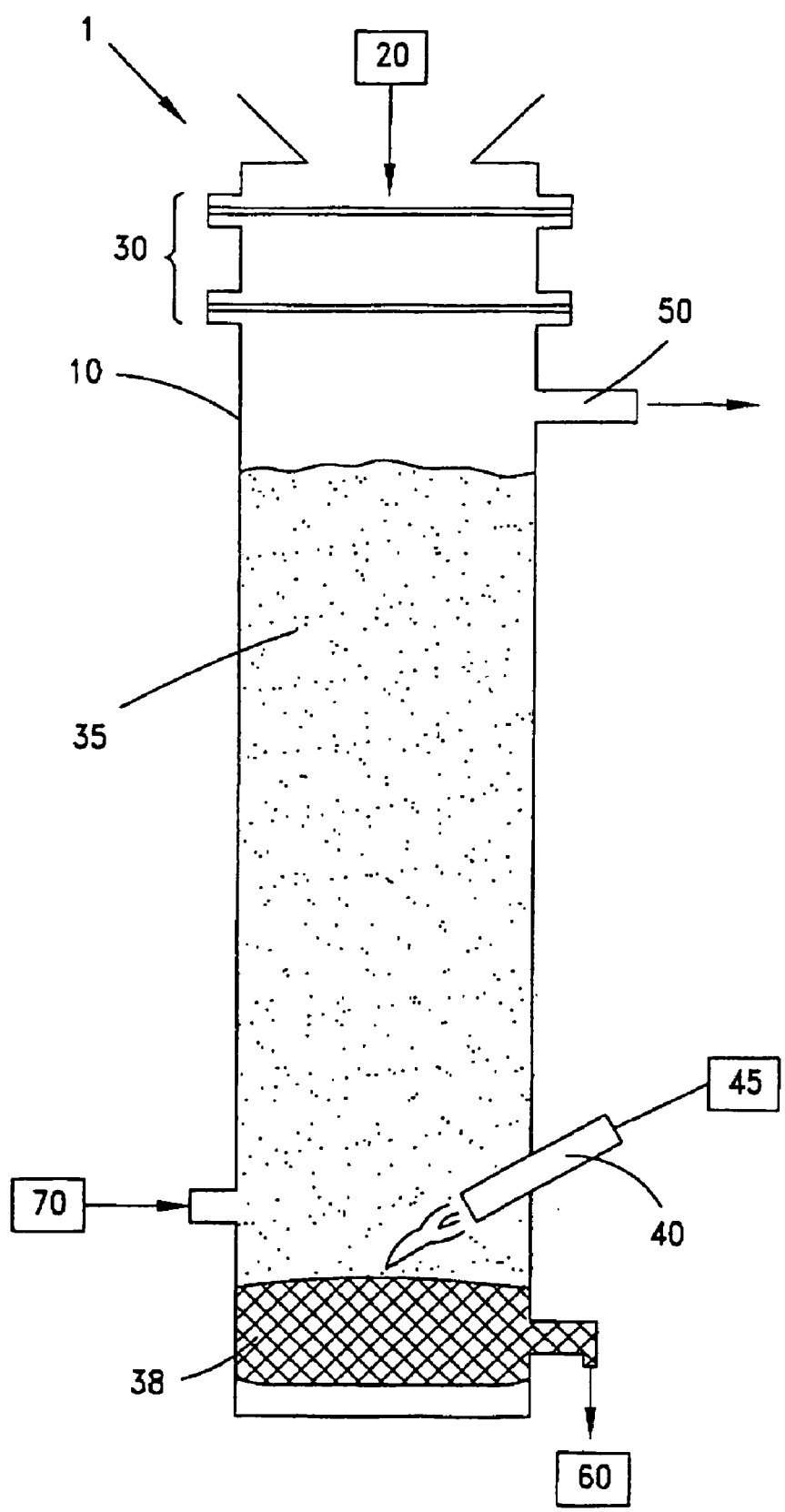
FIG. 1 shows schematically the general layout and main elements of a typical solid/mixed waste plasma processing apparatus of the prior art.

The present invention is defined by the claims, the contents of which are to be read as included within the disclosure of the specification, and will now be described by way of example with reference to the accompanying Figures.

The present invention relates to a system for providing rapid and effective distribution of preheated oxidising fluid or gasses to the waste column in a waste converting apparatus. The term "waste converting apparatus" herein includes any apparatus adapted for treating, processing or disposing of any waste materials, including municipal waste, household waste, industrial waste, medical waste, nuclear waste and other types of waste. The present invention is also directed to such waste converting apparatus having the aforesaid system, and to methods of operating such systems and apparatuses. The apparatus typically comprises a waste converting chamber adapted for accommodating a column of waste, at least one plasma torch means for generating a hot gas jet at an output end thereof and for directing said jet towards a bottom longitudinal part of the chamber. The waste converting apparatus may further comprise at least one gas outlet means at an upper longitudinal part of the chamber, and at least one liquid product outlet at a lower longitudinal part of the chamber. In particular, the waste converting apparatus further comprises at least one oxidising fluid inlet, separate from the plasma torches, and which is also located in the lower, hotter part of the waste converting or processing chamber, for providing oxidising fluid thereto. "Oxidising fluid" is herein taken to include any gas or other fluid capable of oxidising at least in part char found or produced in the hotter, lower parts of the processing chamber of the waste processing apparatus, and includes, for example, oxygen, steam, air, $CO_2$ and any suitable mixture thereof.

According to the present invention, a distribution and mixing chamber is provided, associated with, and in particular in fluid communication with, the oxidising fluid inlet. The distribution and mixing chamber is configured to circumscribe the periphery of the waste column and thus enable fluid communication between the circumferential periphery of the waste column and the oxidising fluid inlet. Advantageously, the distribution and mixing chamber is associated with a discontinuity such as a corner, kink, or any change in the slope of the profile of the chamber, provided in the processing chamber that enables the waste column to overshoot the same as the waste column descends into the processing chamber, and thus enable the distribution and mixing chamber to be formed integrally with the processing chamber.

In particular, the distribution and mixing chamber according to the present invention is characterized in having a peripheral opening in substantially continuous peripheral fluid communication with said column of waste accommodated in said lower part and in fluid communication with at least one said oxidising fluid inlet. By peripheral opening is meant an opening to the distribution and mixing chamber that is substantially continuous along a periphery of the distribution and mixing chamber. In other words the peripheral opening enables fluid communication between substantially all parts of the distribution and mixing chamber and substantially all parts of the periphery of the column of waste at the lower part of the processing chamber during operation thereof.

As will be described in more detail hereinbelow, the distribution and mixing chamber is also characterized in having an outer peripheral wall thereof formed by a lateral outward displacement of an inwardly-facing wall of said lower part of said processing chamber with respect to an inwardly-facing wall of said upper part of the processing chamber. In other words, a wall of the distribution and mixing chamber that peripherally circumscribes the column of waste accommodated at a lower part of the distribution and mixing chamber during operation of the processing chamber is displaced outwardly in a lateral direction with respect to an upper part of the processing chamber.

Furthermore, at least one of the oxidising fluid inlets is associated with at least one plasma torch means such that during operation of the waste processing apparatus, oxidising fluid flowing from the oxidising fluid inlets into said distribution and mixing chamber is directed at a high temperature zone provided by the plasma torch means in order to heat the oxidising fluid and thus promote gasification of char to provide product gases.

Figure 2A:
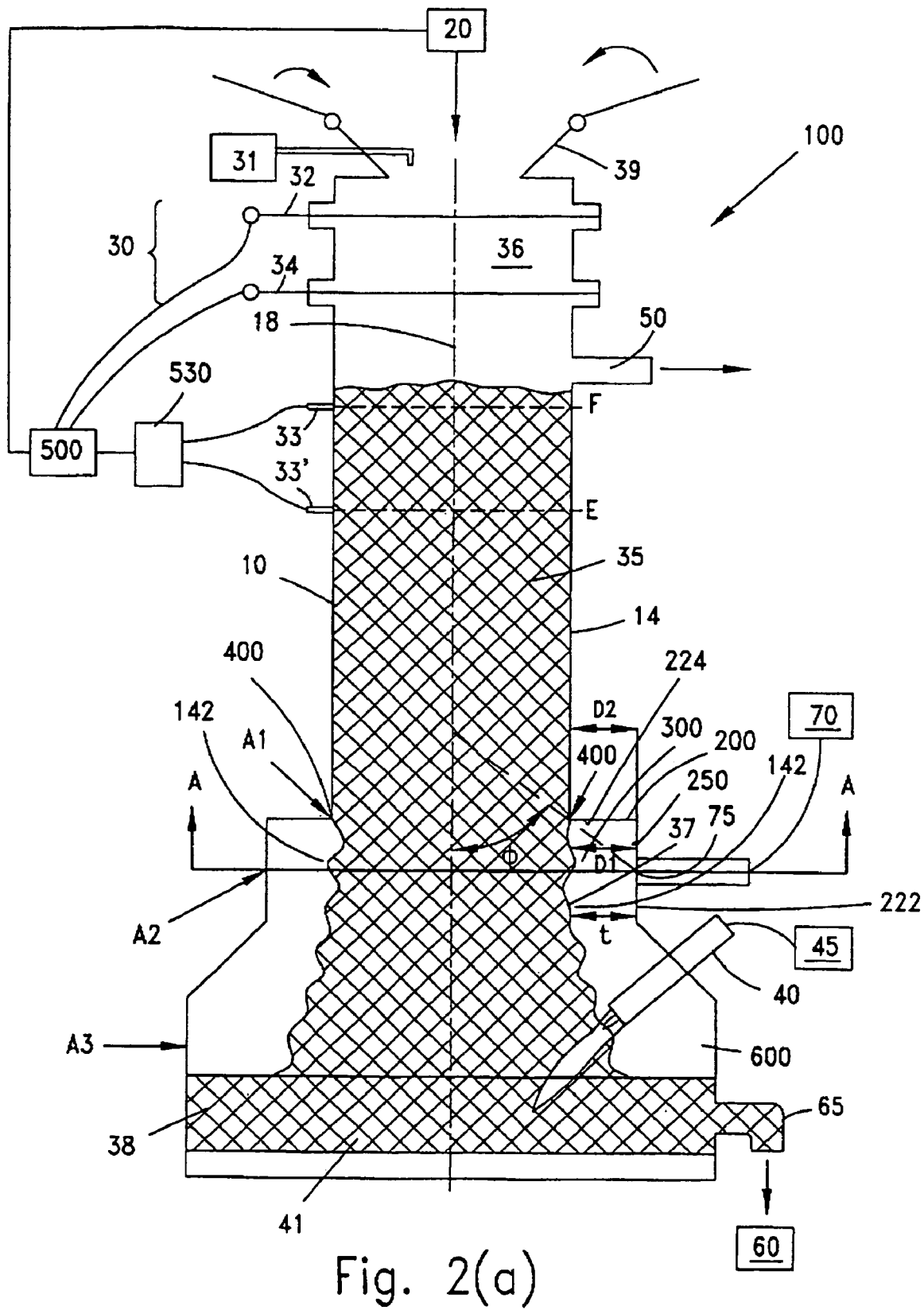
FIG. 2(a) shows schematically the main elements of a first embodiment of the present in relation to a typical plasma processing apparatus.

Referring to the Figures, FIG. 2(a) illustrates a first embodiment of the present invention. The plasma waste processing apparatus, designated by the numeral (100), comprises a processing chamber (10), the upper portion (14) of which, while typically is in the form of a cylindrical or frusta-conical vertical shaft, may be in any desired shape. Typically, a solid or mixed waste feeding system (20) introduces typically solid waste at the upper end of the chamber (10) via a waste inlet means comprising an air lock arrangement (30). Mixed waste may also be fed into the chamber (10), though generally gaseous and liquid waste is removed from the apparatus (10) without substantial treatment. The solid/mixed waste feeding system (20) may comprise any suitable conveyor means or the like, and may further comprise a shredder for breaking up the waste into smaller pieces. The air lock arrangement (30) may comprise an upper valve (32) and a lower valve (34) defining a loading chamber (36) therebetween. The valves (32), (34) are preferably gate valves operated electrically, pneumatically or hydraulically to open and close independently as required. A closeable hop arrangement (39) funnels typically solid and/or mixed waste from the feeding system (20) into the loading chamber (36) when the upper valve (32) is open, and the lower valve (34) is in the closed position. Feeding of waste into the loading chamber (36) typically continues until the level of waste in the loading chamber (36) reaches a predetermined point below full capacity, to minimise the possibility of any waste interfering with closure of the upper valve (32). The upper valve (32) is then closed. In the closed position, each of the valves (32), (34) provides an air seal. When required, the lower valve (34) is then opened enabling the waste to be fed into the processing chamber (10) with relatively little or no air being drawn therewith. The opening and closing of the valves (32), (34), and the feeding of waste from the feeder (20) may be controlled by any suitable controller (500), which may comprise a human controller and/or a suitable computer control system, operatively connected thereto and to other components of the apparatus (100). Preferably, a waste flow sensing system (530) is provided and operatively connected to the controller (500). The sensing system (530) typically comprises one or more suitable sensors (33) at an upper part or level (F) of the chamber (10) for sensing when the level of waste reaches this level. Similarly, the sensing system (530) typically also comprises one or more suitable sensors (33') at a level (E), vertically displaced downwards with respect to level (F) of the chamber (10), for sensing when the level of waste reaches this level. Level (F) may advantageously represent the maximum safety limit for waste in the chamber (10), while level (E) may represent a level of waste within the chamber (10) at which it is efficient to provide more waste to the chamber (10). Thus, the volume in the chamber (10) between level (E) and level (F) may be approximately equal to the volume of waste that may be accommodated in loading chamber (36). Alternatively, or additionally, the location of the sensors (33) and (33') at levels (F) and (E) may be chosen to provide suitable datums for determining an actual flow rate of the waste through the chamber (10) by measuring the time interval between the time when the level of waste is at level (F) to when it reaches level (E), for example. The controller (500) may also be operatively connected to valves (32), (34) to coordinate loading of the loading chamber (36) from the feeding system (20), and unloading of the waste from the loading chamber (36) to the processing chamber (10).

Optionally, the hop arrangement (39) may comprise a disinfectant spraying system (31) for periodically or continuously spraying the same with disinfectant, as required, particularly when medical waste is being processed by apparatus (100).

The processing chamber (10) has a bottom end comprising a liquid product collection zone (41), typically in the form of a crucible, having at least one outlet (65) associated with one or more collection reservoirs (60). The processing chamber (10) further comprises at the upper end thereof at least one gas outlet (50), primarily for collecting product gases from the processing of waste. The upper end of the processing chamber (10) comprises the said air lock arrangement (30), and the processing chamber (10) is typically filled with waste material via the airlock arrangement (30) up to about the level of the primary gas outlet (50). Sensing system (530) senses when the level of waste drops sufficiently (as a result of processing in the chamber (10)) and advises controller (500) to enable another batch of waste to be fed to the processing chamber (10) via the loading chamber (36). The controller (500) then closes lower valve (34) and opens upper valve (32) to enable the loading chamber (36) to be re-loaded via feeding system (20), and then closes upper valve (32), ready for the next cycle.

One or a plurality of plasma torches (40) at the lower end of the processing chamber (10) are operatively connected to suitable electric power, gas and water coolant sources (45), and the plasma torches (40) may be of the transfer or non-transfer types. The torches (40) are mounted in the chamber (10) by means of suitably sealed sleeves, which facilitates replacing or servicing of the torches (40). The torches (40) generate hot gases that are directed downwardly at an angle into the bottom end of the column of waste. The torches (40) are distributed at the bottom end of the chamber (10) such that in operation, the plumes from the torches (40) heat the bottom of the column of waste, as homogeneously as possible, to a high temperature, typically in the order of about 1600° C. or more. The torches (40) generate at their downstream output ends hot gas jets, or plasma plumes, having an average temperature of about 2000° C. to about 7000° C. The heat emanating from the torches (40) ascends through the column of waste, and thus a temperature gradient is set up in the processing chamber (10). Hot gases generated by the plasma torches (40) support the temperature level in the chamber (10). This temperature level is sufficient at least at the lower part of the chamber (10) for continuously converting the waste into product gases that are channeled off via outlet (50), and into a liquid material (38) that may include molten metal and/or slag, which may be periodically or continuously collected at the lower end of the chamber (10) via one or more reservoirs (60).

The apparatus (100) may further comprise a scrubber system (not shown) operatively connected to the outlet (50), for removing particulate matter and/or other liquid droplets (including pitch), as well as any undesired gases (such as HCl, $H_2S$, HF, for example) from the product gas stream leaving the chamber (10) via outlet (50). Particulate matter may include organic and inorganic components. Pitch may be contained in the gas stream leaving outlet (50). Scrubbers capable of performing such tasks are well known in the art and do not require to be further elaborated upon herein. The scrubber is typically operatively connected downstream thereof to a suitable gas processing means (not shown) such as a gas turbine power plant or a manufacturing plant, for example, for economically utilising the cleaned product gases, typically comprising at this stage $H_2$, CO, $CH_4$, $CO_2$ and $N_2$. The scrubber may further comprise a reservoir (not shown) for collecting particulate matter, pitch and liquid matter removed form the gas products by the scrubber. Such particulate matter and liquid matter (including pitch) require further processing.

Optionally, the apparatus (100) may further comprise an afterburner (not shown) operatively connected to the outlet (50) for burning organic or other combustible components in the product gases and connected to suitable afterburner energy utilisation systems and also to gas cleaning systems (not shown). Such energy utilisation systems may include a boiler and steam turbine arrangement coupled to an electric generator. Gas cleaning systems may produce solid waste materials such as fly ash with reagents, and/or liquid solutions comprising waste materials which require further processing.

Oxidising fluid such as air, oxygen or steam may be provided from a suitable source (70) to convert char, produced during pyrolysis of organic waste, into useful gases such as CO and $H_2$, for example. The oxidising fluid is introduced to the lower part of the chamber (10) via one or more suitable inlet ports (75).

The processing chamber (10) comprises a lower part (200) and an upper part (14) in open communication one with the other, thereby enabling the waste in the waste column to descend to the hotter parts thereof. The upper part (14) of the chamber (10) is typically, but not necessarily, in the form of a cylindrical shaft having a substantially vertical longitudinal axis (18), and comprises the gas products outlet (50). The lower part (200) of the chamber (10) includes the crucible (41), one or more plasma torches (40) and one or more oxidising fluid inlet ports (75), and thus comprises the part of the chamber (10) in which gasification and melting of the waste occurs. The inner facing surfaces of processing chamber (10), at least of the lower part (200) thereof, are typically made from one or more suitable refractory materials, such as for example alumina, alumina-silica, magnesite, chrome-magnesite, chamotte or firebrick. Typically, the processing chamber (10), and generally the apparatus (100) as a whole, is covered by a metal layer or casing (not shown) to improve mechanical integrity thereof and to enable the processing chamber to be hermetically sealed with respect to the external environment.

Figure 3A:
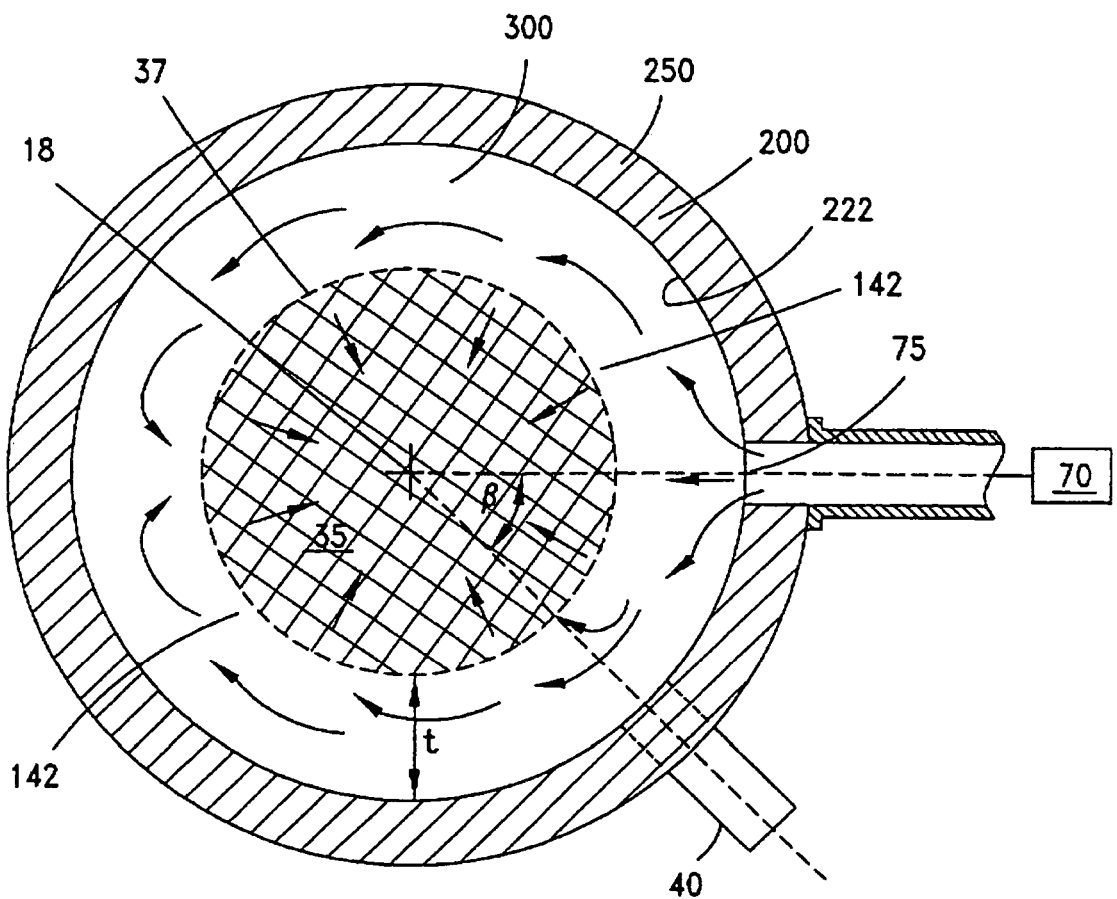
FIG. 3(a) and FIG. 3(b) show alternative cross-sections of the embodiment of FIG. 2(a) taken along X-X.

The present invention is characterised in providing an oxidising fluid distribution and mixing chamber (300) incorporated mainly or fully in the lower part (200) of the processing chamber (10). Referring to FIG. 3(a), the distribution and mixing chamber (300) provides a space between the inwardly facing surface or wall (222) of the processing chamber (10) and the column of waste (35) about the periphery thereof, and thus comprises a substantially continuous peripheral opening (142) in substantially continuous peripheral fluid communication with said column of waste, such that oxidising fluid that is provided to the distribution and mixing chamber (300) via one or more oxidising fluid ports or inlets (75) is able to reach substantially all parts of the column of waste (35) circumferentially or peripherally. The continuous peripheral opening (142) referred to above is thus delineated by the outer perimeter (37) of the column of waste (35). The oxidising fluid is then able to penetrate into the column of waste (35) in a typically more-or-less lateral or radial direction towards the centre of the column of waste, and more or less equally from all sides thereof, enabling the efficient conversion of char, mainly in the form of carbon or coke, into the desired gas products.

Figure 3B:
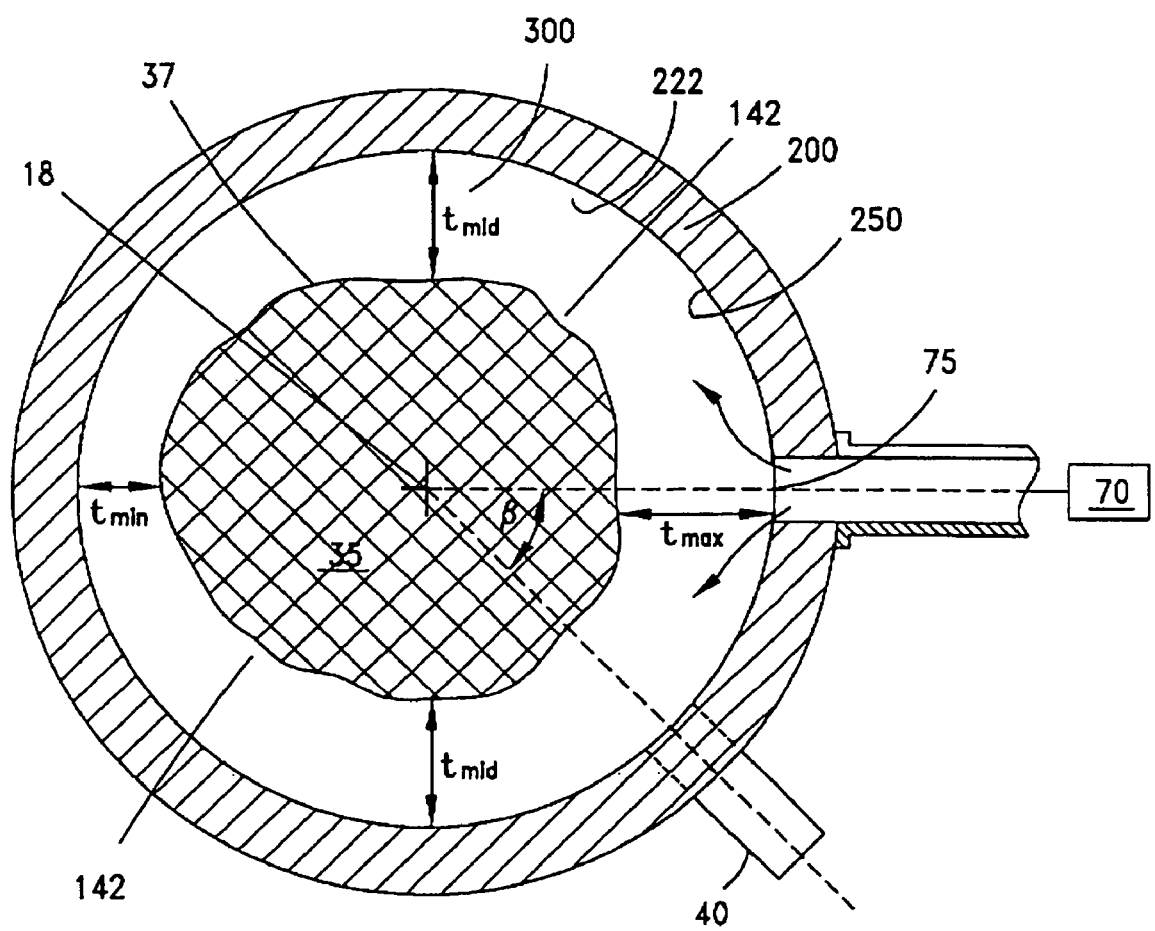

Thus, the distribution and mixing chamber (300) may be configured in a manner to provide a peripheral slot or niche between the inwardly facing wall (222), which is part of the processing chamber wall (250), and the column of waste (35). The slot or niche is of predetermined width (t) around the column of waste (35), i.e., about the perimeter (37) thereof, including the location of the oxidising fluid inlet (75). In other words, the inwardly facing wall (222) is laterally or radially displaced outwards by a first displacement (D1) with respect to the inner facing wall of the said upper part (14) (FIG. 2(a)). This first displacement (D1) is generally equal to (t), depending on the flaring of the waste column (35) in the lower part (200). The width (t) of the distribution and mixing chamber (300) may be approximately uniform, as illustrated in FIG. 3(a), depending on the physical composition and homogeneity of the waste in the column (35), particularly at the perimeter (37) thereof. Alternatively, the distribution and mixing chamber (300) may be configured to provide different widths at different peripheral locations. For example, as illustrated in FIG. 3(b), the width of the distribution and mixing chamber (300) at locations close to the oxidising fluid inlets (75), $t_{max}$, may be greater than at a location 180° thereof, $t_{min}$, to compensate for the reduction in flow area of the oxidising fluid due to its continual penetration into the waste column (35) after leaving the inlets (75). The different widths $t_{max}$ and $t_{min}$, are achieved by displacing the wall (222) by correspondingly different first displacements (D1) around the periphery thereof around the chamber (10).

In many embodiments of the present invention, the distribution and mixing chamber (300) is formed by providing a "discontinuity." (400) in the cross-sectional profile of the processing chamber (10) in the longitudinal direction, effectively displacing the inwardly facing wall (222) of the lower part (200) of the processing chamber (10) laterally, and in many configurations radially, outwards typically at the oxidising fluid inlet (75) with respect to an inner facing wall of an upper part of the processing chamber (10) directly above this inlet. The term discontinuity is herein taken to refer to any corner, kink, sharp change, longitudinal projection or any other change in the slope of the profile of the processing chamber taken along the longitudinal direction, i.e., parallel to axis (18). Since the waste does not exhibit the flow characteristics of a perfect fluid, nor is it composed of homogeneous particles or of a slow-moving fluid, the waste overshoots the discontinuity as it travels downwardly through the processing chamber (10), thus providing a lateral or radial space between the column of waste (35) and the wall (222). In other embodiments, the discontinuity (400) may be in the form of a smooth or curved transition to the lower part (200), so long as the transition is configured to ensure that the waste overshoots the same and provides the radial or at least lateral gap between the laterally displaced inwardly facing wall (222) and the waste column (35). In yet other embodiments, the discontinuity is in the form of a peripheral (and typically cylindrical) wall downwardly depending from the upper part and laterally displaced inwardly with respect to the laterally displaced inwardly facing wall (222).

A second recessed chamber (600) may be provided for each plasma torch (40) such that the tip thereof is radially displaced outwardly with respect to the perimeter (37) of the waste column (35), thereby minimising deposition of melted products thereon and thus reducing the possibility of congestion thereof.

Thus, referring to FIG. 2(a), in the first embodiment of the present invention, a peripheral portion comprising an inwardly facing wall (222), which is at least part of said inner wall (250) of the said lower part (200), is laterally displaced outwardly with respect to the upper part (14) by said first displacement (D1). Thus, the discontinuity (400) is formed by increasing the section or radius of the processing chamber (10) just above the location of the oxidising fluid inlet (75), in a step change. The distribution and mixing chamber (300) is thus provided between the wall (222) and the circumferential periphery (37) of part of the column of waste (35) that is accommodated in the processing chamber (10) at a longitudinal station corresponding to the wall (222), said periphery defining at least part of the peripheral opening (142) of the distribution and mixing chamber (300). In this embodiment, the at least one oxidising fluid inlet (75) is provided in the wall (222). Also, the distribution and mixing chamber (300) further comprises an upper annular wall (224) which extends inwardly from wall (222) towards the axis (18), by a second displacement (D2) to connect, directly or indirectly the inner facing wall (222) to the discontinuity (400). Thus, typically, the second said displacement (D2) is equal in magnitude to the said first displacement (D1). In other embodiments, for example the embodiment of FIG. 7, the second displacement (D2) is in fact less than the first displacement (D1). The peripheral wall (222) may be cylindrical as shown, or indeed frustoconical or any other suitable shape.

Thus, referring to FIG. 2(a), the transverse cross-sectional area of said processing chamber (10) taken along planes perpendicular to the longitudinal axis (18) at least between the longitudinal position (A2) of an uppermost said oxidising fluid inlet (75) to the longitudinal position (A3) of a lowermost said plasma torch (40) is substantially greater than the transverse cross-sectional area of said upper part (14) just above the discontinuity (400) at (A1).

In general, each said oxidising fluid inlet (75) may be provided at a location in said distribution and mixing chamber (300) such as to define an angle φ between the longitudinal axis (18) of the processing chamber (10) and an imaginary line connecting the center of said oxidising fluid inlet (75) to the said discontinuity (400), taken along a plane including said axis and said oxidising fluid inlet center, wherein φ is typically in the range of between about 0.5° and about 120°. Thus, in certain cases, such as in the fifth embodiment, for example, illustrated in FIG. 7 and described hereinbelow, φ is greater than 90°, and may reach, say, about 120°, for example.

Figure 2B:
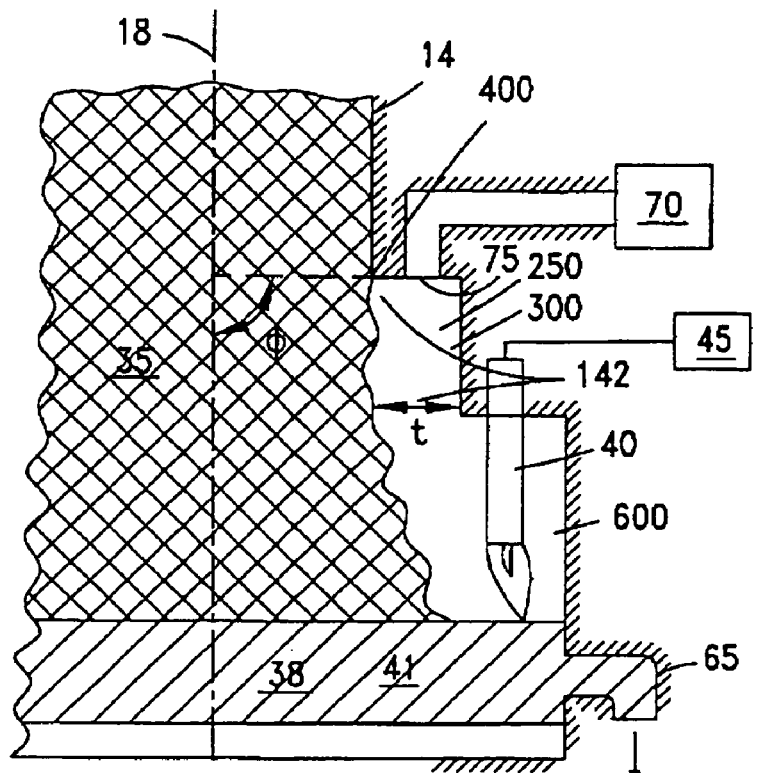
FIGS. 2(b) and 2(c) show alternative arrangements of the embodiment of FIG. 2(a).

Additionally or alternatively, and as illustrated in FIG. 2(b), one or more oxidising inlets (75) may be provided in the annular wall (224). Such vertical inlets may be provided by drilling a horizontal shaft or bore into a firebrick such as to intersect a vertical shaft also bored therein, to form an L-shaped passage that extends from a lower part of the brick to a horizontal end of the brick. The aperture formed by the passage at the lower part of the brick serves as a said oxidising fluid inlet (75), whereas the aperture at the horizontal end thereof is suitable connected to a suitable oxidising fluid source.

Figure 2C:
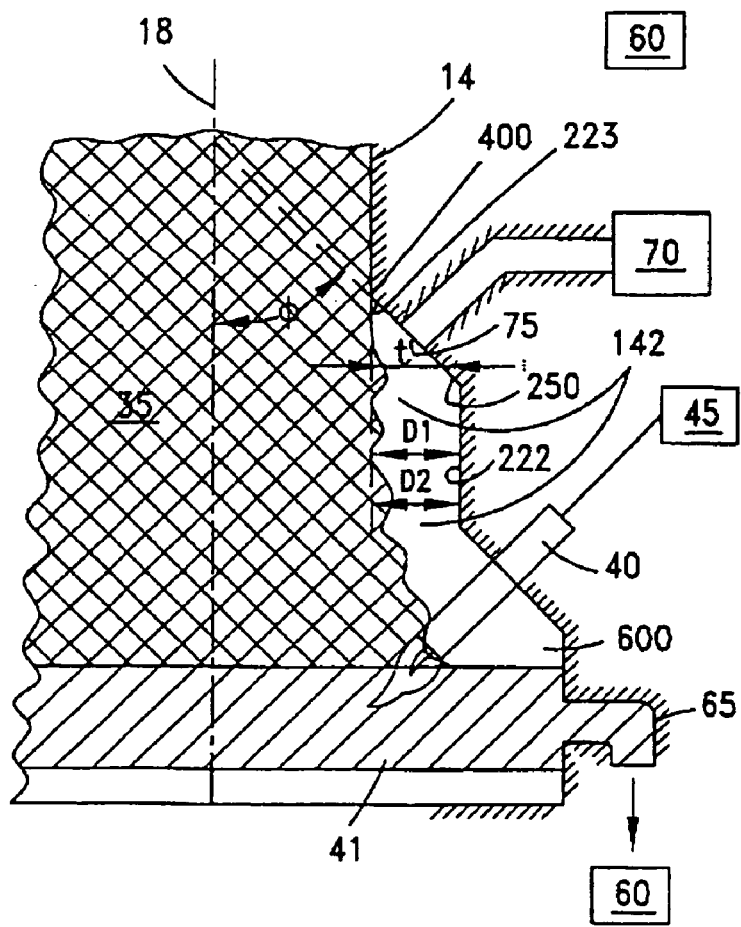

Alternatively, and as illustrated in FIG. 2(c), the distribution and mixing chamber (300) further comprises an upper frustaconical wall (223) which extends inwardly from wall (222) towards the axis (18), by a second lateral displacement (D2) to connect, directly or indirectly the inner facing wall (222) to the discontinuity (400). Thus, typically, the said second lateral displacement (D2) is also equal in magnitude to the said first displacement (D1) for this embodiment. A suitable oxidising fluid inlet (75) may be provided on the frustoconical inwardly-facing wall (223) by drilling a shaft at the appropriate angle into a firebrick such as to intersect a horizontal shaft also bored therein, to form an elbow-shaped passage that extends from a lower sloping part of the brick to a horizontal end of the brick. The aperture formed by the passage at the sloping part of the brick serves as a said oxidising fluid inlet (75), whereas the aperture at the horizontal end thereof is suitable connected to a suitable oxidising fluid source.

In the embodiment illustrated in FIGS. 2(a), 2(b) and 2(c), the lower end of the distribution and mixing chamber (300) is open, and also provides fluid communication with the column of waste in a peripheral manner, and in fact the lower part (200) of the processing chamber (10) increases section or radius a second time just above the location of the plasma torches (40) to provide said second chamber (600). The distribution and mixing chamber (300) is thus also in fluid communication with the second chamber (600). Thus, the one or more oxidising fluid inlets (75) are each associated with at least one plasma torch (40) such that during operation of the waste processing apparatus (100), oxidising fluid flowing from the oxidising fluid inlets (75) into said distribution and mixing chamber (300) is directed at a high temperature zone provided by the plasma torch (40) in order to heat the oxidising fluid and thus promote gasification of the char to provide product gases. Preferably, and as illustrated in FIGS. 3(a) and 3(b), for example, the angle β between the plane including the longitudinal axis (18) and the center of one oxidising fluid inlet (75), and the plane including the longitudinal axis (18) and the center of the end of a said plasma torch (40) is less than or equal to about ±170°, and preferably about ±90°, and more preferably about ±20°.

Figure 4:
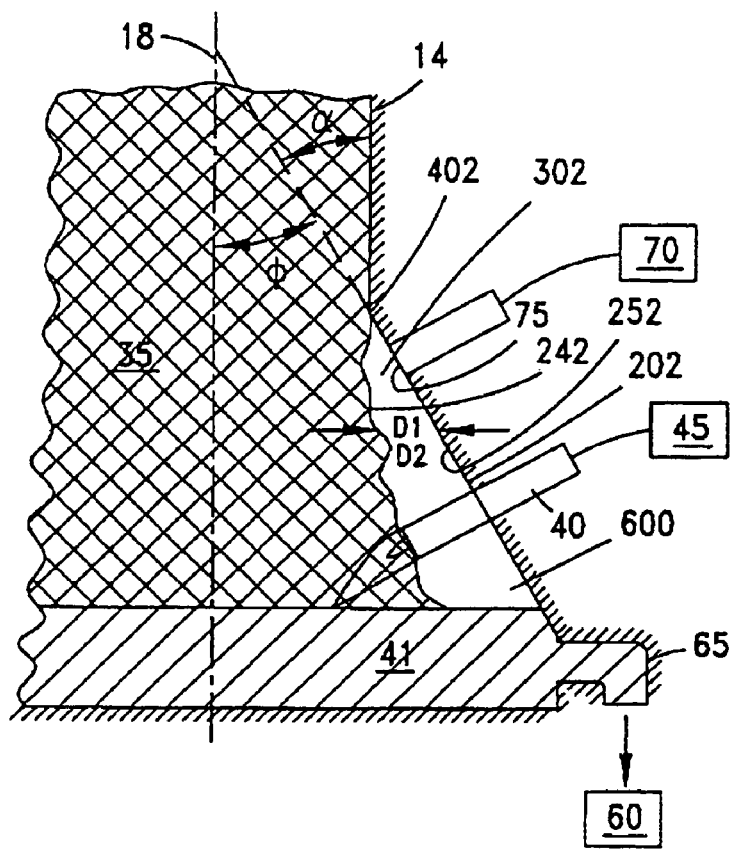
FIG. 4 shows schematically the main elements of a second embodiment of the present invention.

A second embodiment of the present invention, illustrated in FIG. 4, comprises the same structural elements as the first embodiment, with the exception of the said lower part (200), discontinuity (400), and distribution and mixing chamber (300), as hereinbefore described, mutatis mutandis. In the second embodiment of the present invention, a discontinuity (402) is formed between the upper part (14) of the processing chamber (10) and the lower part (202) thereof by increasing the section or radius of the processing chamber (10) just above the location of the oxidising fluid inlet (75), though less abruptly than in the first embodiment. Thus, the inwardly facing wall of the lower part (202) of the processing chamber (10) may be frusto-conical in form, having a half-conical angle, say α, while the upper part (14) may be cylindrical, for example, or also frusto-conical but with a conical angle somewhat smaller than α. In this embodiment, the angle α coincides with and is equal to angle φ. The angle α may have any suitable value ranging from about 0.5° to about 90°. Thus, in the second embodiment of the present invention, at least part of an inwardly-facing wall (252) of the said lower part (202) is laterally displaced outwardly with respect to an upper portion of the lower part (200), or indeed with respect to the upper part (14), wherein the lateral or radial displacement increases with downstream progression along the longitudinal axis (18). In other words, the first displacement (D1) and the second displacement (D2) are nominally equal at any plane taken at right angles to the said axis (18), and (D1) and (D2) increase downwardly along axis (18), although at different rates.

As with the first embodiment, the distribution and mixing chamber (302) has a peripheral opening (242) in substantially continuous peripheral fluid communication with said column of waste (35), defined by the periphery (37) of the column of waste (35) that is accommodated therein during operation of the processing chamber. Furthermore, the lower end of the distribution and mixing chamber (302) is open, and in fact in the second embodiment, the lower part (202) of the processing chamber (10) also increases section or radius about the location of the plasma torches (40), though this is achieved in a continuous manner from the discontinuity (402), and the distribution and mixing chamber (302) is thus also in fluid communication with the torches (40). Similarly, at least one and preferably all the oxidising fluid inlets (75) are each associated with at least one plasma torch (40) such that during operation of the waste processing apparatus (100), oxidising fluid flowing from the oxidising fluid inlets (75) into said distribution and mixing chamber (302) is directed at a high temperature zone provided by the plasma torch (40) in order to heat the oxidising fluid and thus promote rapid and uniform gasification of the char to provide product gases. As with the first embodiment, the oxidising fluid inlets (75) are each preferably disposed in a location such that the angle β between the plane including the longitudinal axis (18) and the center of said oxidising fluid inlet (75), and the plane including the longitudinal axis (18) and the center of the end of a said plasma torch (40), is less than or equal to about ±170°, and preferably about ±20°

Figure 5:
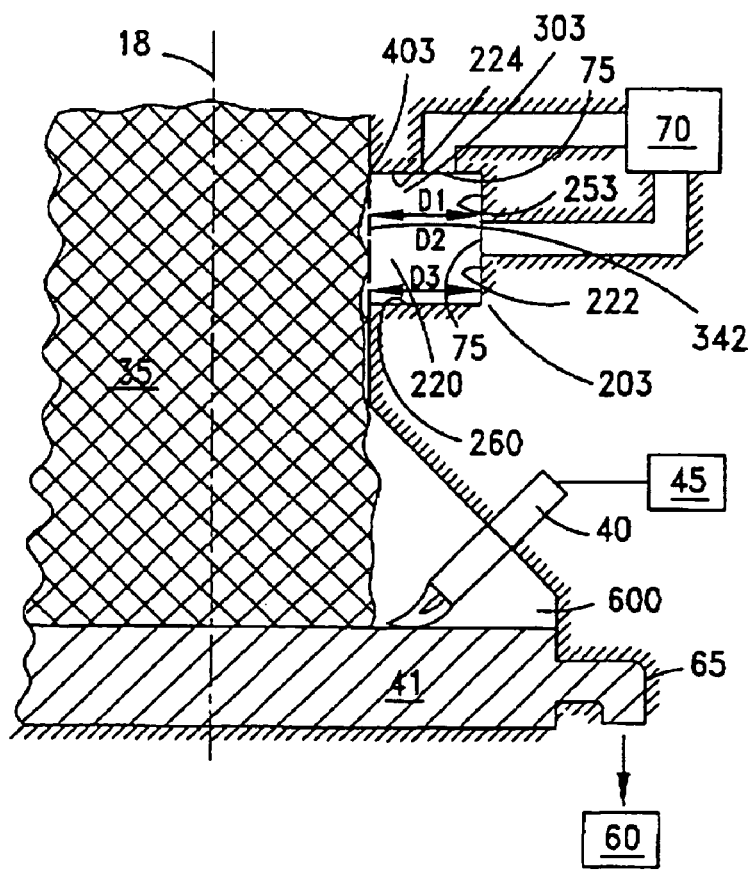
FIG. 5 shows schematically the main elements of a third embodiment of the present invention.

A third embodiment of the present invention, illustrated in FIG. 5, comprises the same structural elements as the first embodiment, with the exception of the said lower part (200), discontinuity (400), and distribution and mixing chamber (300), as hereinbefore described, mutatis mutandis. In the third embodiment of the present invention, a discontinuity (403) is formed between the upper part (14) of the processing chamber (10) and the lower part (203) thereof by increasing the section or radius of the processing chamber (10) at or just above the location of the oxidising fluid inlet (75), in a step change, in a similar manner to the first embodiment. However, in this embodiment, the distribution and mixing chamber (303) is bounded by a lower annular wall (260) formed in the wall (253), in addition to the upper annular wall (224) connecting the discontinuity (403) to the inner facing wall (253). The said lower annular wall (260) thus extends inwardly towards the axis (18) by a third displacement (D3), which is generally smaller in magnitude than the said second displacement (D2) for this embodiment. Thus, the distribution and mixing chamber (303) is in the form of an annular recess formed into the inwardly facing wall (253), which may be cylindrical as illustrated in FIG. 5, or indeed frustoconical or any other suitable shape, and comprises a peripheral opening (342) in substantially continuous peripheral fluid communication with said column of waste (35), defined by the periphery (37) of the column of waste (35) that is accommodated therein during operation of the processing chamber. The oxidising fluid inlet ports (75) may be located at any suitable part of the chamber (303), for example on the outer wall (222) or annular walls (224), (260) of the recess (313). The surface area of the lower annular wall (260) is less than the surface area of the upper annular wall (224) by an amount S which may range from 1% to about 99% of the area of the upper annular wall (224). The difference in areas S is sufficient to enable hot plasma gases generated by the plasma torches (40) to penetrate into the distribution and mixing chamber (303). In this embodiment, the lower part (203) of the processing chamber (10) increases in section or radius a second time just above the location of the plasma torches (40), and the distribution and mixing chamber (303) is thus also in fluid communication with therewith via the waste column (35).

Figures 6A, 7:
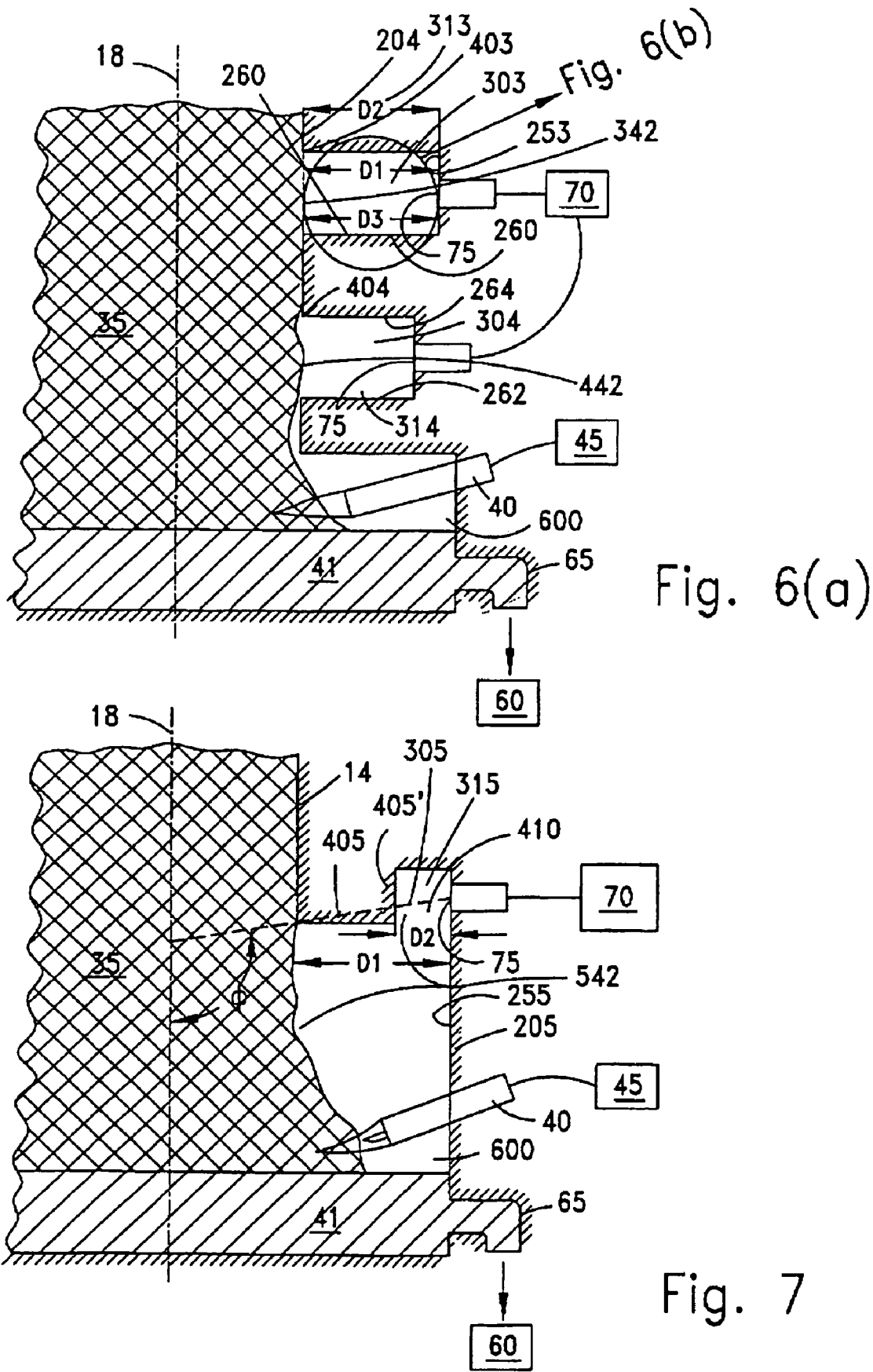
FIG. 6(a) shows schematically the main elements of a fourth embodiment of the present invention.
FIG. 7 shows schematically the main elements of a fifth embodiment of the present invention.

A fourth embodiment of the present invention, illustrated in FIG. 6(a), comprises the same structural elements as the third embodiment, as hereinbefore described, mutatis mutandis. In the fourth embodiment of the present invention, a second distribution and mixing chamber (304) is provided downstream of the first distribution and mixing chamber (303), and has a second discontinuity (404) formed in the lower part (202) of the processing chamber (10) by increasing the section or radius of thereof, at or just above the location of the additional oxidising fluid inlets (75), in a step change, in a similar manner to the upper distribution and mixing chamber (303). The second distribution and mixing chamber (304) is also bounded by a lower annular wall (262) and by an upper annular wall (264) formed in the wall (253). Thus, the second distribution and mixing chamber (304) is in the form of an annular recess (314) formed into wall (253), which may be cylindrical as illustrated in FIG. 6(a), or indeed frustoconical or any other suitable shape. As with the first distribution and mixing chamber (303), the second distribution and mixing chamber (304) has a peripheral opening (442) in substantially continuous peripheral fluid communication with said column of waste (35), defined by the periphery (37) of the column of waste (35) that is accommodated therein during operation of the processing chamber. The additional one or more oxidising fluid inlet ports (75) may be located at any suitable part of the second distribution and mixing chamber (304), for example on the cylindrical or annular portions of the recess (314). The surface area of the lower annular wall (262) is less than the surface area of the upper annular wall (264) by an amount S' which may range from 1% to about 99% of the area of the upper annular wall (264). The difference in areas S' is sufficient to enable hot plasma gases generated by the plasma torches (40) to penetrate into the distribution and mixing chamber (304). The upper annular wall (264) of the second chamber (304) is also typically less laterally displaced than the lower annular wall (260) of the first chamber (303), at least sufficient to enable hot plasma gases generated by the plasma torches (40) to penetrate into the upper first distribution and mixing chamber (303) from the lower distribution and mixing chamber (304) and/or directly from the plasma torches (40). In this embodiment, the lower part (204) of the processing chamber (10) increases in section or radius or lateral displacement a third time just above the location of the plasma torches (40), and the first distribution and mixing chamber (303) and the second distribution and mixing chamber are thus also in fluid communication with therewith via the waste column (35).

A fifth embodiment of the present invention, illustrated in FIG. 7, comprises the same structural elements as the first embodiment, with the exception of the said lower part (200), discontinuity (400), and distribution and mixing chamber (300), as hereinbefore described, mutatis mutandis. In the fifth embodiment of the present invention, a discontinuity (405) is provided in the form of a cylindrical ridge or wall (405') extending from the upper part (14) of the processing chamber (10) into the lower part (205) thereof. In this embodiment, the distribution and mixing chamber (305) comprises at least an annular recess (315) extending upwardly into the wall (255) of the lower part (205), which has an increased section or radius with respect to the upper part (14) of the processing chamber (10), and the distribution and mixing chamber (305) optionally also extends downwardly in the lower part (205). In other words, a cylindrical wall (405') is provided downwardly depending from said upper part (14) and laterally displaced inwardly with respect to said laterally displaced inwardly facing wall (255). Alternatively, the wall (405') may be considered to form part of the upper part (14), in which case at least an upper part of the distribution and mixing chamber (305) may be thought of as being comprised in an upper part of the apparatus (100), longitudinally overlapping with a lower portion of the upper part (14). Thus, in the distribution and mixing chamber (305) the downward facing annular opening (410) of the recess (315) constitutes at least part of the peripheral opening (542) in substantially continuous peripheral fluid communication with said column of waste (35). Furthermore, if the distribution and mixing chamber (305) extends downwardly past the level of the discontinuity (405) as illustrated in FIG. 7, the continuous peripheral opening (542) of the distribution and mixing chamber (305) is further defined by the periphery (37) of the column of waste (35) that is accommodated therein during operation of the processing chamber. The oxidising fluid inlets (75) are advantageously provided within the recess (315), further protecting them from deposition of molten products, and facilitating circumferential distribution of oxidising fluid. The fifth embodiment is also particularly suitable for use with waste having high fluidity, which would otherwise expand radially to fill or congest the distribution and mixing chambers of other embodiments. The lower part of the recess (315) is in open communication with the waste column (35), enabling oxidising gas to freely penetrate the same from all sides. In this embodiment, the lower part (205) of the processing chamber (10) increases section or radius a second time just above the location of the plasma torches (40), and the distribution and mixing chamber (305) is thus also in fluid communication with therewith. The oxidising fluid inlet ports (75) may be located at any suitable part of the chamber (305), for example on the cylindrical or upper annular portions of the recess (315). Further, at least one and preferably all the oxidising fluid inlets (75) are each associated with at least one plasma torch (40) such that during operation of the waste processing apparatus (100), oxidising fluid flowing from the oxidising fluid inlets (75) into said distribution and mixing chamber (305) is directed at a high temperature zone provided by the plasma torch (40) in order to heat the oxidising fluid and thus promote combustion of the char to provide product gases. As with the first embodiment, the oxidising fluid inlets (75) are each preferably disposed in a location such that the angle β between the plane including the longitudinal axis (18) and the center of said oxidising fluid inlet (75), and the plane including the longitudinal axis (18) and the center of the end of a said plasma torch (40), is less than or equal to about ±170°, and preferably about ±20°

Figure 8A:
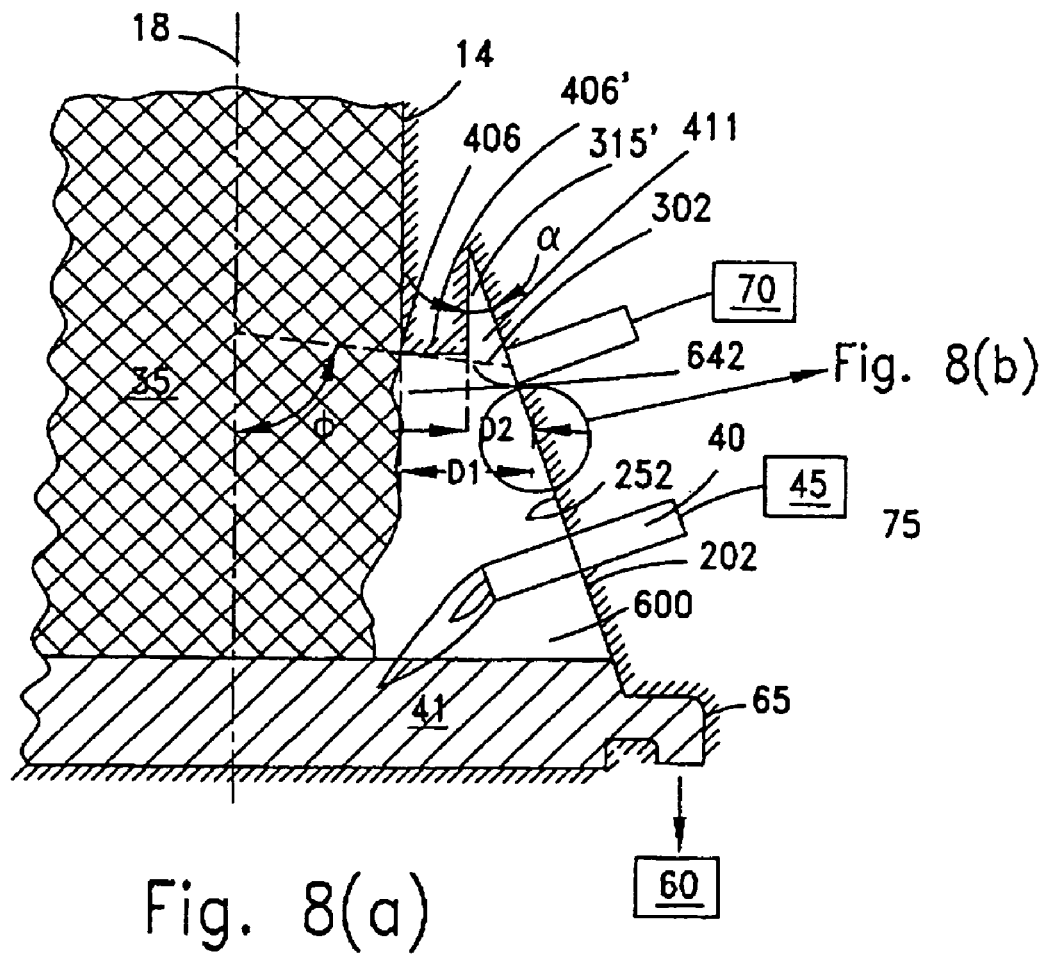
FIG. 8(a) shows schematically the main elements of a sixth embodiment of the present invention.

A sixth embodiment of the present invention, illustrated in FIG. 8(a), comprises the same structural elements as the second embodiment, with the exception of the said discontinuity (402), as hereinbefore described, mutatis mutandis. In the sixth embodiment of the present invention, a discontinuity (406) is in the form of a cylindrical ridge or wall (406') extending from the upper part (14) of the processing chamber (10) and into the lower part (202) thereof. In other words, a cylindrical wall (406') is provided downwardly depending from said upper part (14) and laterally displaced inwardly with respect to said laterally displaced inwardly facing wall (252). Alternatively, the wall (406') may be considered to form part of the upper part (14), in which case at least an upper part of the distribution and mixing chamber (302) may be thought of as being comprised in an upper part of the apparatus (100), longitudinally overlapping with a lower portion of the upper part (14). Thus, in the distribution and mixing chamber (302) the downward facing annular opening (411) of the recess (315') constitutes at least part of the peripheral opening (642) in substantially continuous peripheral fluid communication with said column of waste (35). Furthermore, as the distribution and mixing chamber (305) optionally and advantageously extends downwardly past the level of the discontinuity (406) as illustrated in FIG. 8(a), the continuous peripheral opening (642) of the distribution and mixing chamber (306) is further defined by the periphery (37) of the column of waste (35) that is accommodated therein during operation of the processing chamber. Similarly to the second embodiment, the one or more oxidising fluid inlets (75) are each associated with at least one plasma torch (40) such that during operation of the waste processing apparatus (100), oxidising fluid flowing from the oxidising fluid inlets (75) into said distribution and mixing chamber (302) is directed at a high temperature zone provided by the plasma torch (40) in order to heat the oxidising fluid and thus promote combustion of the char to provide product gases. Thus, in the sixth embodiment of the present invention, at least part of an inwardly-facing wall (252) of the said lower part (202) is laterally displaced outwardly with respect to an inwardly facing wall of said upper part (14), wherein the lateral or radial displacement increases with downstream progression along the longitudinal axis (18). In this embodiment, the first displacement (D1) is greater than the second displacement (D2) by an amount equal to the lateral width of wall (406') at any plane taken at right angles to the said axis (18), and both (D1) and (D2) increase downwardly along axis (18). As with the first embodiment, the oxidising fluid inlets (75) are each preferably disposed in a location such that the angle β between the plane including the longitudinal axis (18) and the center of said oxidising fluid inlet (75), and the plane including the longitudinal axis (18) and the center of the end of a said plasma torch (40), is less than or equal to about ±170°, and preferably about ±20°

Thus, in all embodiments, the provision of a peripheral portion in the form of an inwardly facing wall of the lower part of the processing chamber (10) that is laterally or radially displaced outwardly with respect to an inner-facing wall of the upper part of the processing chamber (10) serves to form a distribution and mixing chamber, which comprises a peripheral opening to provide substantially continuous fluid communication between the distribution and mixing chamber and the periphery of the column of waste that is accommodated in the lower part of the processing chamber during operation thereof. Such a distribution and mixing chamber, when coupled to one or more oxidising fluid inlets, enables oxidising fluid to be preheated, mainly by mixing with hot plasma gases flowing from the plasma torches (40), and distributed circumferentially or peripherally with respect to a corresponding periphery (37) of the column of waste (35). Further, since the oxidising fluid inlets (75) are radially or laterally displaced with respect to the column of waste there is less likelihood of these inlets (75) being obstructed by molten waste material. Similarly, the provision of recesses (600) enables the output ends of the plasma torches (40) to be radially displaced with respect to the column of waste (35), resulting in similar advantages, mutatis mutandis.

Figure 6B:
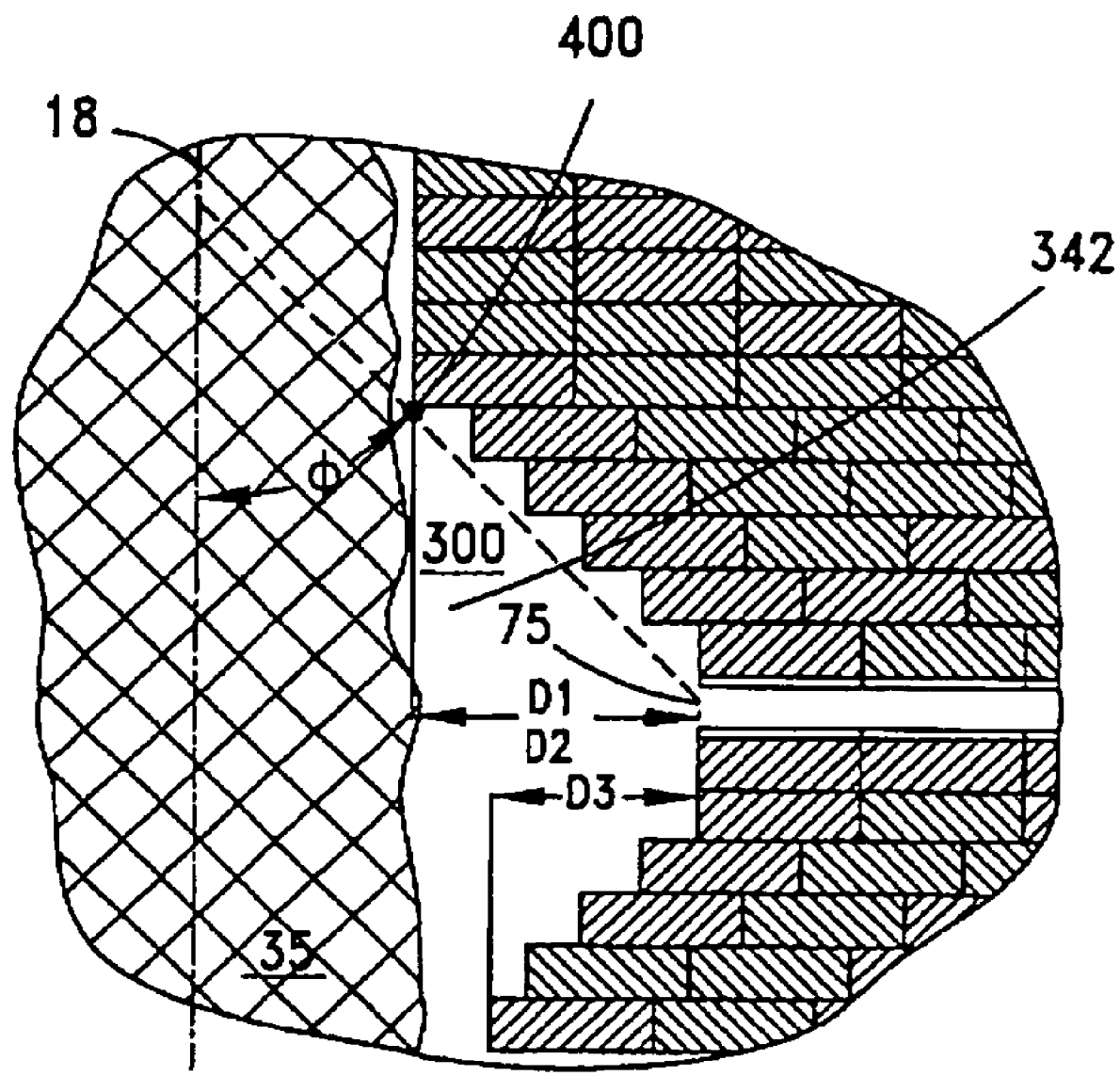
FIG. 6(b) shows in detail the profile of the distribution and mixing chamber wall made from standard firebricks.
Figure 8B:
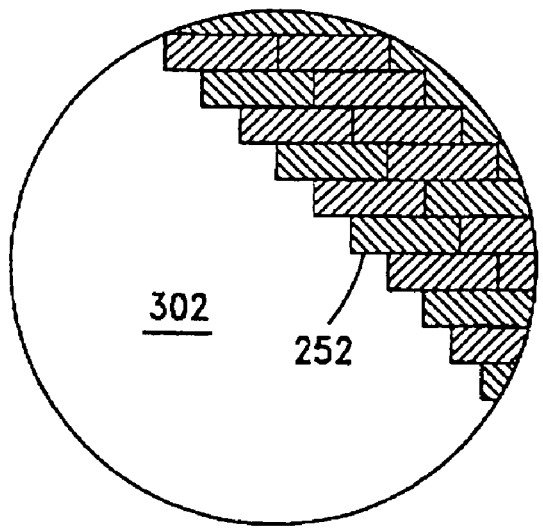
FIG. 8(b) shows in detail the profile of the distribution and mixing chamber wall made from standard firebricks.

In all embodiments, the corresponding distribution and mixing chamber, and preferably the corresponding discontinuity, are advantageously incorporated in the profile of the processing chamber (10), and are thus an integral part thereof being formed from refractory material, as in other parts or the whole of the lower part of the processing chamber (10). In the embodiments described hereinbefore, the corresponding distribution and mixing chambers may be made from refractory material molded in appropriately sized and shaped slabs. Alternatively, the refractory material may be formed in the shape of regular bricks of standard size and shape, and the bricks laid appropriately such as to provide the required profile. For example, the sloping profile of the lower part of the processing chamber of the second and sixth embodiments may actually comprise a stepped arrangement of bricks, in which each successive upper layer of bricks is offset laterally a little more towards the axis (18), as illustrated in FIG. 8(b), for example. Similarly, the annular profile of the mixing or distribution and mixing chambers of the first, third, fourth and fifth embodiments may be approximated by, and thus comprise, a different stepped arrangement of bricks, in which each successive upper layer of bricks is first offset laterally a little more away from the axis (18) up to a maximum displacement, and then each successive upper layer of bricks may be offset laterally a little more towards from the axis (18) as illustrated in FIG. 6(b), for example to provide an idealised "annular" distribution and mixing chamber. Particularly when using standard firebricks, the longitudinal cross-sectional profile of the processing chamber (10) may be substantially rectangular or polygonal, rather than circular.

Figure 9A:
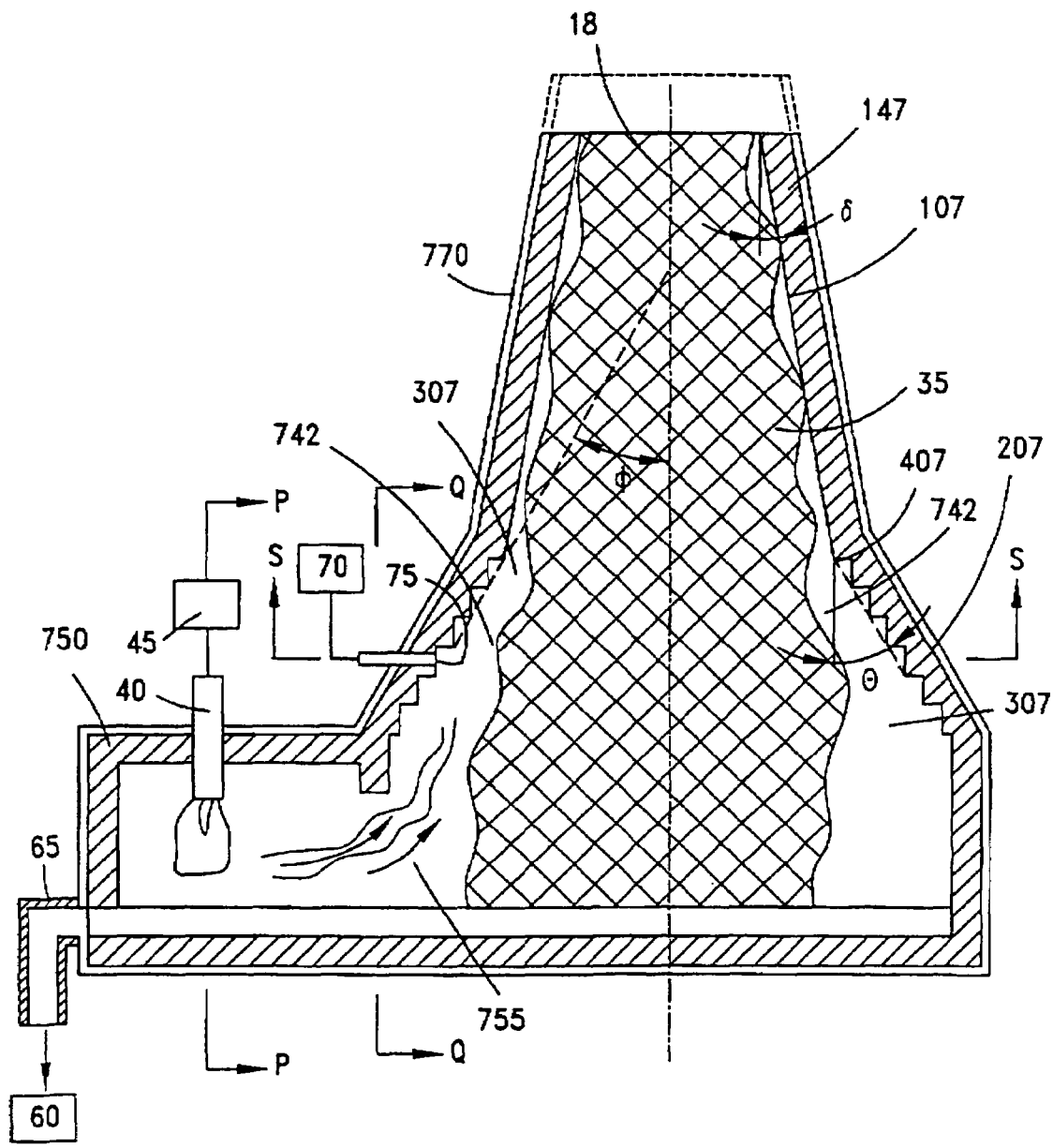
FIG. 9(a) shows schematically the main elements of a seventh embodiment of the present invention in relation to a typical plasma processing apparatus.
Figure 9B:
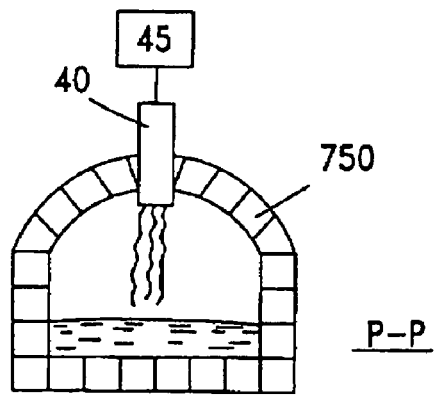
FIGS. 9(b), 9(c) and 9(d) show cross-sections of the embodiment of FIG. 9(a) taken along P-P, Q-Q, and S-S, respectively.
Figure 9C:
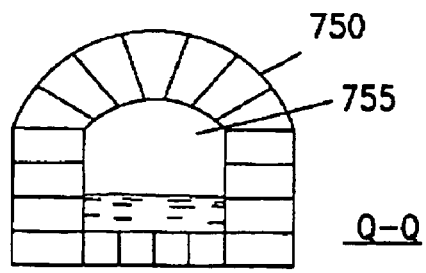
Figure 9D:
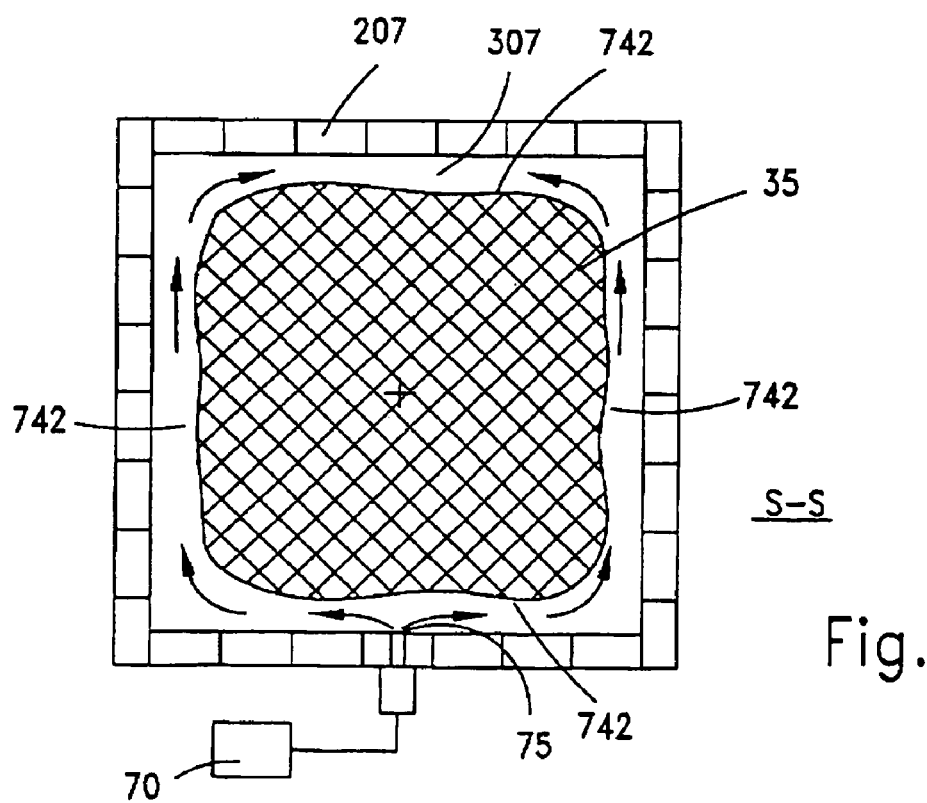

A seventh embodiment of the present invention, illustrated in FIGS. 9(a) to 9(d), comprises the same structural elements as the first embodiment as hereinbefore described, mutatis mutandis, with the exception of the following details. In the seventh embodiment of the present invention, which is particularly suited for small scale processing of waste, the processing chamber (107) comprises a lower part thereof that is substantially frustro-pyramidal in form having substantially polygonal cross-sections at planes substantially perpendicular to the longitudinal axis of the said processing chamber. The term "frustro-pyramidal" is herein taken to refer to a pyramidal type of structure having three or more triangular-shaped sides rising from a polygonally-shaped base (correspondingly having three or more edges) towards an apex, and wherein the apex of the pyramidal structure is truncated. Preferably, the upper part is also substantially frustro-pyramidal in form having substantially polygonal cross-sections at planes substantially perpendicular to the longitudinal axis of the said processing chamber. The polygonal cross-sections of said upper part and of said lower part are typically similar, and in this embodiment they are substantially rectangular in longitudinal cross-section, as illustrated in FIG. 9(d), although in other embodiments they may comprise any number of sides as required. The upper portion (147) is comprised of sloping walls of a shallow angle δ to the longitudinal axis (18), typically, but not necessarily restricted to, from about 0.1° to about 0.4°. The lower portion (207) is also comprised of sloping walls, but at an angle θ to the longitudinal axis (18), typically, but not necessarily restricted to, the range of angles between from about 0.5° to about 30°, wherein θ>δ. The angles δ and θ are herein considered to be equivalent to conical half-angles. A discontinuity (407) is thus formed between the upper part (147) and the lower part (207). The processing chamber (107) is typically made from standard rectangular bricks, in a locally stepped profile, and thus the discontinuity (407) may be defined as the change in slope of the corresponding imaginary line representing an envelope comprising the bricks. A metal outer layer (770) is provided for improving the mechanical integrity of the apparatus as a whole and for maintaining it sealed or air-tight with respect to the outside environment. In this embodiment, the one or more plasma torches (40) are comprised in a lateral auxiliary chamber (750), which is in open communication with the processing chamber (107) at a lower part thereof, and in particular with respect to the distribution and mixing chamber (307), via a suitable portal (755) which is typically in the form of an archway. Optionally, additional lateral auxiliary chambers may be provided around the lower part (207) of the processing chamber (107), to further increase the number of plasma torches (40) and improve the distribution thereof. The additional lateral auxiliary chambers are also in open communication with the processing chamber (107) at a lower part thereof via a suitable archway or portal, for example. In this embodiment, the distribution and mixing chamber (307) is substantially rectangular in form, and the peripheral opening (742) thereof peripherally circumscribes the waste column (35) to enable oxidising fluid to be distributed thereto in a peripheral manner by means of one or more oxidising fluid inlets (75) which may be comprised thereat, as illustrated in FIG. 9(d). The hot gases provided by the plasma torches (40) provide a high temperature zone which extends from the auxiliary chamber (750) to the distribution and mixing chamber (307) via the portal (755). Alternatively or additionally, one or more oxidising fluid inlets (75) may be provided at the auxiliary chamber (750) so that the oxidising fluid is initially in closer proximity to the plasma torches (40), the oxidising fluid subsequently flowing to the distribution and mixing chamber (307) via portal (755).

Thus, the one or more oxidising fluid inlets (75) are each associated with at least one plasma torch (40) such that during operation of the waste processing apparatus (100), oxidising fluid flowing from the oxidising fluid inlets (75) into said distribution and mixing chamber (307) is directed at a high temperature zone provided by the plasma torch (40) in order to heat the oxidising fluid and thus promote gasification of char to provide product gases. As with the first embodiment, the oxidising fluid inlets (75) are each preferably disposed in a location such that the angle β between the plane including the longitudinal axis (18) and the center of said oxidising fluid inlet (75), and the plane including the longitudinal axis (18) and the center of the end of a said plasma torch (40), is less than or equal to about ±170°, and preferably about ±20°

Thus, the first displacement (D1) is the distance by which the inner facing wall of the lower part of the processing chamber is displaced laterally outwardly from the inwardly facing wall of the upper part (14). In annular distribution and mixing chambers such as exemplified in the embodiments of FIGS. 2(a), 2(b), 2(c), 3(a), 3(b), 5, 6(a) and 7, (D1) is about constant in any given lateral direction. In conical distribution and mixing chambers such as exemplified in the embodiments of FIGS. 4, 8 and also in the embodiment of FIG. 9(a), the distance or displacement (D1) increases downwards along axis (18). The second displacement (D2) refers to the lateral extent of the upper wall connecting the inwardly facing wall of the distribution and mixing chamber to the discontinuity. In the embodiments exemplified in FIGS. 2(a), 2(b), 2(c), 3(a), 3(b), 4, 5, 6(a) and 9, (D1) and (D2) are nominally identical. However, in the embodiments exemplified in FIGS. 7 and 8(a), the upper wall of the distribution and mixing chamber does not extend laterally all the way to the discontinuity, and thus (D2) is less than (D1) by an amount nominally equal to the width of the downwardly depending wall at the discontinuity. As described hereinbefore, the discontinuity in these embodiments is in the form of a wall or extension that projects longitudinally from the lower portion of the upper part into the corresponding lower part. The third displacement (D3) refers to the lateral extent of the lower wall of the distribution and mixing chamber, such a lower wall being comprised in the embodiments exemplified in FIGS. 5 and 6(a), with (D3) being typically less than (D2). However, in the other embodiments illustrated in the Figures, the distribution and mixing chamber does not comprise such a lower wall.

Thus, the present invention is also directed to a method for distributing and mixing oxidizing fluid along and into a periphery of a waste column accommodated in a waste processing apparatus having a waste processing chamber adapted for processing such a waste column and comprising at least one plasma torch means having an output end thereof extending into a lower part of said waste processing chamber for providing sufficient heat to said lower part at least for enabling organic waste accommodated therein to be converted into fuel gases, said method comprising
(a) providing a distribution and mixing chamber as described herein;
(b) during operation of said processing chamber causing oxidising fluid to flow from the said at least one oxidising fluid inlet and into said distribution and mixing chamber and around the periphery of the column of waste accommodated in said processing chamber, such that said oxidizing fluid is directed at a high temperature zone provided by the at least one plasma torch means that is associated with said at least one oxidising fluid inlet.

While the distribution and mixing chamber according to the present invention is best incorporated as an integral part of a plasma-type waste converting or processing apparatus, the distribution and mixing chamber of the present invention is also retrofittable on many existing plasma-based waste processing apparatuses, according to individual circumstances, mutatis mutandis.

While in the foregoing description describes in detail only a few specific embodiments of the invention, it will be understood by those skilled in the art that the invention is not limited thereto and that other variations in form and details may be possible without departing from the scope and spirit of the invention herein disclosed.

The invention claimed is:

1. A waste processing apparatus having a substantially longitudinal waste processing chamber adapted for accommodating a column of waste, wherein said processing chamber comprises a chamber upper part joined to a chamber lower part via a transition therebetween, said upper part comprising waste inlet means and at least one gas outlet means, said lower part comprising at least one plasma torch means having an output end thereof extending into said lower part for providing sufficient heat at least for enabling melting inorganic components of said waste and for converting organic components of said waste into fuel gases, wherein said transition comprises a change in the slope of the inside profile of the processing chamber between said upper part and said lower part taken along a longitudinal direction, such that at least a part of the inside wall of said lower part is displaced, in a plane perpendicular to the longitudinal axis of said processing chamber, outwardly from said transition along the periphery thereof with respect to the inside wall of said upper part thus forming additional peripheral space in said lower part with respect to said upper part of the chamber, said peripheral space serving as at least one oxidizing fluid distribution and mixing chamber, said fluid distribution and mixing chamber comprising at least one oxidizing fluid inlet for providing oxidizing fluid thereto from a suitable source; characterized in that:

said distribution and mixing chamber is configured to circumscribe the periphery of said waste column enabling said oxidizing fluids to penetrate into said waste column from all directions thereby enabling oxidation of char formed during the process of converting the organic components of said waste into fuel gases from all sides of said column of waste simultaneously; and said at least one oxidizing fluid distribution and mixing chamber is located above the output end of said at least one plasma torch means, said location is chosen such that:

said oxidizing fluid is in contact with said column of waste in the gasification zone of said processing chamber wherein said organic component of said waste are converted into fuel gases and the majority of said char is formed, thereby allaowing said oxidizing fluid to efficiently convert said char into useful product gases; and said oxidizing fluid enters said processing chamber above the melted inorganic components of said waste, thereby preventing cooling of said melted inorganic components.

2. A waste processing apparatus as claimed in claim 1, wherein at least one of the inside wall of the lower part of the processing chamber and the inside wall of the upper part of said processing chamber is made from a suitable refractory material.

3. A waste processing apparatus as claimed in claim 1, wherein the inside wall of the distribution and mixing chamber is laterally displaced from the inside wall of the upper part of the processing chamber in a substantially uniform manner by a first displacement that is about constant along the periphery of said inside wall of said distribution and mixing chamber, said first displacement being defined in any suitable plane substantially perpendicular to a longitudinal axis of said processing chamber.

4. A waste processing apparatus as claimed in claim 1, wherein the distribution and mixing chamber comprises one oxidizing fluid inlet, and wherein the lateral displacement of the inner wall of said distribution and mixing chamber with respect to said inner wall of the upper part of the processing chamber is greater at the location of said oxidizing fluid inlet than at any other location along the periphery of the said inside wall of said distribution and mixing chamber in a plane substantially perpendicular to a longitudinal axis of said processing chamber.

5. A waste processing apparatus as claimed in claim 4, wherein the lateral displacement of the inner wall of the distribution and mixing chamber with respect to said inner wall of the upper part of the processing chamber is a maximum at the location of the oxidizing fluid inlet and a minimum at a location laterally opposite said oxidizing fluid inlet.

6. A waste processing apparatus as claimed in claim 1, wherein the distribution and mixing chamber is in the form of a peripheral niche having an upper substantially annular wall radically extending from the transition.

7. A waste processing apparatus as claimed in claim 6, wherein the distribution and mixing chamber comprises a substantially cylindrical inside wall substantially co-axial with a longitudinal axis of the processing chamber.

8. A waste processing apparatus as claimed in claim 7, wherein the at least one oxidizing fluid inlet is comprised on the cylindrical inside wall.

9. A waste processing apparatus as claimed in claim 6, wherein at least one oxidizing fluid inlet is comprised on the upper annular wall.

10. A waste processing apparatus as claimed in claim 1, wherein the distribution and mixing chamber is an upper portion of the lower part of the processing chamber and is in the form of a peripheral frustoconical wall extending from the transition having a conical half-angle that is larger than that of the inside wall of said upper part of said processing chamber.

11. A waste processing apparatus as claimed in claim 10, wherein the upper part of the processing chamber is substantially cylindrical, having a conical half-angle of about 0°.

12. A waste processing apparatus as claimed in claim 1, wherein at least the inside wall of the distribution and mixing chamber is substantially cylindrical in form having a larger internal radius than that of the inside wall of the upper part of the processing chamber at least just above the transition.

13. A waste processing apparatus as claimed in claim 12, wherein the upper part of the processing chamber is substantially cylindrical.

14. A waste processing apparatus as claimed in claim 1, wherein the inside wall of the distribution and mixing chamber is substantially frusto-pyramidal in form having substantially polygonal cross-sections in planes substantially perpendicular to the longitudinal axis of the processing chamber.

15. A waste processing apparatus as claimed in claim 14, wherein the inside wall of the upper part of the processing chamber is substantially frusto-pyramidal in form having substantially polygonal cross-sections in planes substantially perpendicular to the longitudinal axis of the said processing chamber.

16. A waste processing apparatus as claimed in claim 15, wherein the polygonal cross-sections of the upper part and of the lower part are substantially rectangular.

17. A waste processing apparatus as claimed in claim 1, wherein the lower part of the distribution and mixing chamber is in open communication with the part of the lower part of the processing chamber which is disposed below said distribution and mixing chamber.

18. A waste processing apparatus as claimed in claim 6, wherein the lower part of the distribution and mixing chamber is bound by a lower annular wall radially extending towards the longitudinal axis of the processing chamber.

19. A waste processing apparatus as claimed in claim 18, wherein the inner facing edge of the lower annular wall is distanced from the longitudinal axis of the processing chamber more than the distance from said axis to the transition in a lateral direction.

20. A waste processing apparatus as claimed in claim 19, wherein the surface area of the lower annular wall is less than the surface area of the upper annular wall by an amount S which may range from about 1% to about 99% of said surface area of said upper annular wall.

21. A waste processing apparatus as claimed in claim 20, further comprising a second oxidizing fluid distribution and mixing chamber vertically displaced downwardly with respect to the distribution and mixing chamber.

22. A waste processing apparatus as claimed in claim 21, wherein, for the second oxidizing fluid distribution and mixing chamber, the surface area of the lower annular wall thereof is less than the surface area of the upper annular wall thereof by an amount S' which may range from about 1% to about 99% of said surface area of said upper annular wall of said second oxidizing fluid distribution and mixing chamber.

23. A waste processing apparatus as claimed in claim 1, wherein the lower part of the processing chamber comprises a suitable niche for accommodating the at least one plasma torch means therein, said niche being lower than the distribution and mixing chamber, said niche being configured to accommodate said at least one plasma torch such that the output end of said at least one plasma torch is distanced from the longitudinal axis of said processing chamber more than the distance from said axis to the transition.

24. A waste processing apparatus as claimed in claim 1, wherein the at least one plasma torch means is comprised in a suitable auxiliary chamber laterally disposed with respect to the processing chamber and in communication therewith via a suitable portal, such that the output end of said at least one plasma torch means is distanced from the longitudinal axis of said processing chamber more than the distance from said axis to the transition.

25. A waste processing apparatus as claimed in claim 24, further comprising a plurality of the auxiliary chambers, wherein each of said additional auxiliary chamber is laterally disposed with respect to the processing chamber and in communication therewith via a suitable portal, such that the output end of the at least one plasma torch means comprised therein is distanced from the longitudinal axis of said processing chamber more than the distance from said axis to the transition.

26. A waste processing apparatus as claimed in claim 25, wherein at least one of the auxiliary chambers further comprises at least one oxidizing fluid inlet.

27. A waste processing apparatus as claimed in claim 1, wherein the transition is in the form of any one of a corner, kink, sharp change, longitudinal projection, a smooth transition and a curved transition, when viewed in a vertical cross-sectional plane including the longitudinal axis of the processing chamber.

28. A waste processing apparatus as claimed in claim 1, wherein the at least one plasma torch is positioned in the processing chamber lower part such that the cross sectional area of said lower part, measured in a plane perpendicular to the longitudinal axis of the processing chamber, at the position of the centre of the output end of said at least one plasma torch is substantially greater than the cross-sectional area, measured in a plane perpendicular to the longitudinal axis of the processing chamber, of the upper part of said processing chamber at least just above the transition.

29. A waste processing apparatus as claimed in claim 1, wherein at least one of the oxidizing fluid inlets may be provided at a location in the distribution and mixing chamber such that the angle $\phi$ between the longitudinal axis of the processing chamber and an imaginary line connecting the center of said oxidizing fluid inlet to the top of the transition, said imaginary line being disposed on an imaginary plane that includes both said axis and said center of the oxidizing fluid inlet, is in the range of between about 0.5° and about 120°.

30. A waste processing apparatus as claimed in claim 1, wherein at least one the oxidizing fluid inlet is disposed at a location such that the angle $\beta$ between the plane including the longitudinal axis of the processing chamber and the center of said oxidizing fluid inlet, and the plane including said longitudinal axis and the center of the output end of a the plasma torch, is less than or equal to about ±170°.

31. A waste processing apparatus as claimed in claim 30, wherein angle $\beta$ is about ±20°.

32. A waste processing apparatus as claimed in claim 1, further comprising a cylindrical wall downwardly depending from the transition and laterally displaced towards the longitudinal axis of the processing chamber with respect to the laterally displaced inner wall of the lower part of the processing chamber.

33. A waste processing apparatus as claimed in claim 1, wherein the at least one distribution and mixing chamber is located in an upper portion of the lower part of the processing chamber.

34. A method for distributing and mixing oxidizing fluid along and into a periphery of a waste column accommodated in a waste processing apparatus according to claim 1, said method comprising:
(a) providing a column of waste in the processing chamber via the waste inlet;
(b) during operation of said processing chamber causing oxidizing fluid to flow from the at least one oxidizing fluid inlet into the distribution and mixing chamber and around the periphery of the column of waste accommodated in said processing chamber, such that said oxidizing fluid is in communication with a high temperature zone provided by the at least one plasma torch means.

* * * * *